United States Patent
Ethridge et al.

(10) Patent No.: US 7,356,042 B2
(45) Date of Patent: Apr. 8, 2008

(54) DISTRIBUTED ETHERNET HUB

(75) Inventors: Barry J. Ethridge, Fort Worth, TX (US); Mahlon D. Kimbrough, Bedford, TX (US); James J. Gainer, Keller, TX (US); Joseph L. Whitehead, Decatur, TX (US)

(73) Assignee: Tellabs Beford, Inc., Bedford, TX (US)

( * ) Notice: Subject to any disclaimer, the term of this patent is extended or adjusted under 35 U.S.C. 154(b) by 1001 days.

(21) Appl. No.: 10/176,542

(22) Filed: Jun. 21, 2002

(65) Prior Publication Data

US 2002/0163921 A1 Nov. 7, 2002

(51) Int. Cl.
H04L 12/413 (2006.01)

(52) U.S. Cl. .................. 370/445; 370/402; 370/419

(58) Field of Classification Search ........ 370/445–448, 370/352, 353, 354, 419, 420, 402
See application file for complete search history.

(56) References Cited

U.S. PATENT DOCUMENTS

| | | | | |
|---|---|---|---|---|
| 4,654,889 A | * | 3/1987 | Shutterly | 398/60 |
| 4,727,592 A | * | 2/1988 | Okada et al. | 714/55 |
| 4,763,317 A | | 8/1988 | Lehman et al. | |
| 4,985,892 A | | 1/1991 | Camarata | |
| 4,998,247 A | | 3/1991 | Irvine-Halliday et al. | |
| 5,144,466 A | * | 9/1992 | Nakamura et al. | 398/51 |
| 5,170,272 A | * | 12/1992 | Onno | 398/58 |
| 5,251,203 A | | 10/1993 | Thompson | |
| 5,553,071 A | | 9/1996 | Aranguren et al. | |
| 5,684,799 A | | 11/1997 | Bigham et al. | |
| 5,815,295 A | * | 9/1998 | Darcie et al. | 398/72 |
| 5,864,415 A | * | 1/1999 | Williams et al. | 398/72 |
| 5,926,303 A | * | 7/1999 | Giebel et al. | 398/117 |
| 5,991,270 A | * | 11/1999 | Zwan et al. | 370/249 |
| 6,333,940 B1 | * | 12/2001 | Baydar et al. | 370/506 |

FOREIGN PATENT DOCUMENTS

EP   0 526104 A2   2/1993

OTHER PUBLICATIONS

"The Ethernet System", 1.1-1.10, Quick Reference Guide to the Ethernet System, Sep. 4, 1995.
Semeria, "Switches and Routers" 3TECH, Oct. 1995, pp. 15-21.
Sherer, "Sherer's Fable, or the True Meaning of Bandwidth," 3 TECH Oct. 1995, pp. 3-7.
Stern et al., "On the Subject of TCP/IP," SCAN Technologies, 1996, pp. 1-11.

(Continued)

Primary Examiner—Min Jung
(74) Attorney, Agent, or Firm—Baker Botts L.L.P.

(57) ABSTRACT

A technique for multiplexing high speed computed data with digitized voice signals onto a fiber optic cable for transfer to a local central office. The data packets of a number of computers are networked by way of a distributed hub that extends to residences, offices, apartments, etc. The data packets are switched outside the switching fabric of a local central office and routed to the internet or elsewhere. Command signals that are for accessing the internet are transmitted and received as 10 MHz Ethernet data packets on the distributed hub.

19 Claims, 10 Drawing Sheets

OTHER PUBLICATIONS

Stern et al., "On the Subject of Routers," SCAN Technologies, 1996, pp. 1-4.
Stern et al., "On the Subject of Transparent Bridges," 1996, pp. 1-8.
Goldberg, "Cable Modems—The Journey from Hype to Hardware," Electronic Design, Apr. 15, 1996, pp. 65-80.
Mace, "The Perfect Internet Connection," PC Magazine, Jul. 1996, pp. 196-198.
Marconi Communications, DISC'S Digital Loop Carrier System General Description—Technical Documentation, #363-255-100, Issue 4, Apr. 1998 (Entire Publication).
Marconi Communications, DICS'S GR 303 Application Engineering—Technical Documentation, #363-250-110C, Issue 2, Jun. 1999 (Entire Publication).
Marconi Communications, DISC'S MX System General Description—Technical Documentation, #363-265-100, Issue 2, Aug. 1998 (Entire Publication).
Marconi Communications, Single-Family ONU 24 Pedestal Description and Installation—Technical Documentation, #640-851-600, Issue 2, Jan. 1999 (Entire Publication).
Marconi Communications, DISC'S MX Application Engineering—Technical Documentation, #363-200, Issue 2, Jun. 1999 (Entire Publication).
Marconi Communications, DISC'S System End-to-End Test Procedures—Technical Documentation, #363-250-501C/S, Issue 3, Jun. 1999 (Entire Publication).
Marconi Communications, DISC'S Remote Digital Terminal—Acceptance and Turnup—Technical Documentation, #363-250-401C, Issue 10, Jun. 1999 (Entire Publication).
Marconi Communications, DISC'S FIBERCAST Video Equipment—Installation and Maintenance Technical Documentation, #363-250-404, Issue 3, Jun. 1999 (Entire Publication).
Marconi Communications, DISC'S Remote Digital Terminal—Installation Procedures Technical Documentation, #363-250-400, Issue 5, Jun. 1999 (Entire Publication).
Marconi Communications, DISC'S Digital Loop Carrier—Maintenance and Trouble Clearing—Technical Documentation, #363-250-500/5.1, Issue 3, Jun. 1999 (Entire Publication).
Marconi Communications, DISC'S GR 303-Service Conversion—Method of Prodecure—Technical Documentation, #363-250-900, Issue 4, Nov. 1999 (Entire Publication).
Marconi Communications, DISC'S Digital Loop Carrier System, Channel Unit Installation Procedures—Technical Documentation, #363,252-402C, Issue 4, Jun. 1996 (Entire Publication).
Marconi Communications, DISC'S Fiber-in-the-Loop Optical Network Unit—Acceptance and Turnup—Technical Documentation, #363-256450C/5.1 Issue 4, Jun. 1999 (Entire Publication).
Marconi Communications, DISC'S FITL 12- to 24- Channel ONU Upgrade Procedures—Technical Documentation, #363-850-301/5.1. Issue 1, Aug. 1998 (Entire Publication).
Marconi Communications, QCU 60 Single Party Message Telephone Service, Quad Channel Unit (Optical Network Unit)—Description, Application, Installation—Technical Documentation #363-252-738, Issue 1, Jun. 1998 (Entire Publication).
Marconi Communications —QCU 20 Single Party Service Quad Channel Unit (Remove Digital Terminal) Description, Application, Installation—Technical Documentation, #363-252-728, Issue 1, Aug. 1997 (Entire Publication).

* cited by examiner

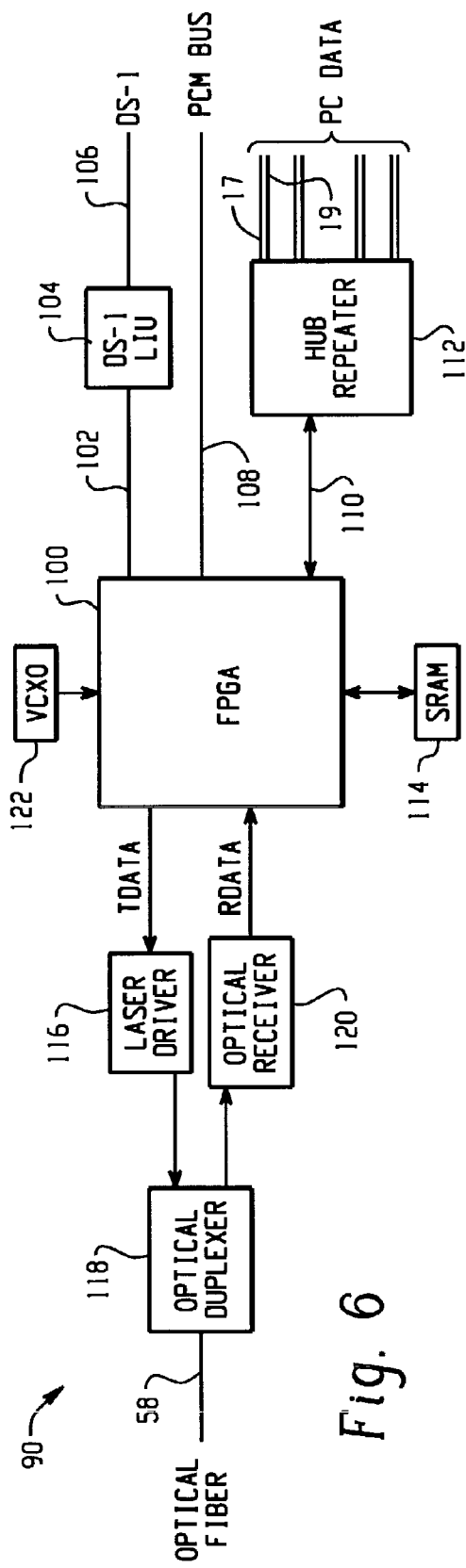
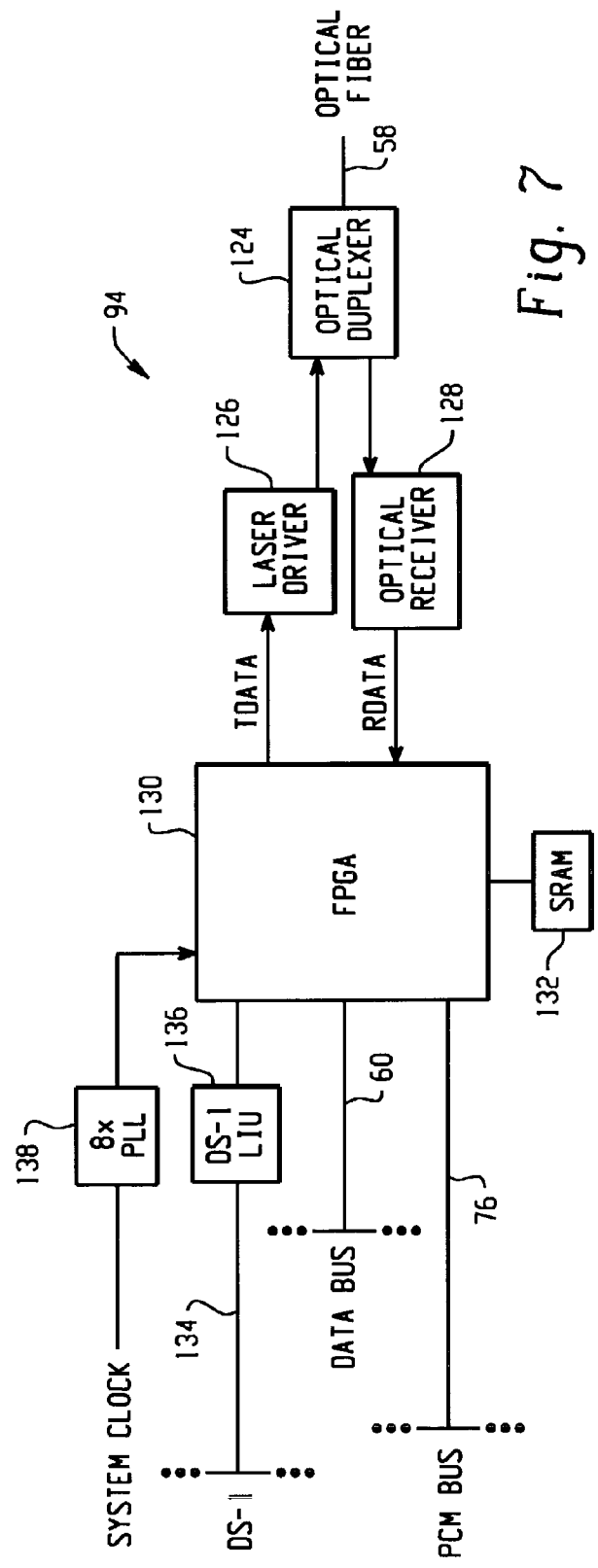

DISTRIBUTED ETHERNET HUB

TECHNICAL FIELD OF THE INVENTION

The present invention relates in general to telecommunication equipment and local area networks, and more particularly to an arrangement for extending an Ethernet network and allowing subscriber access to the internet network, without tying up voice paths in central office switching equipment.

BACKGROUND OF THE INVENTION

The widespread use and advancement of telecommunication equipment and services have facilitated the dispersal of information of all types, including personal, business, governmental, educational, etc. It is not without question that there is a significant benefit to society when information of all types is readily available. While public and institutional libraries have been available for many decades for allowing access to the vast volumes of information, the access to such information was often burdensome and time consuming.

The popularity of the internet, and the access thereto in recent years, has enjoyed a great deal of success, due primarily to the ease of access and the ability to provide new and updated information and data on a daily or hourly basis. Moreover, with the abundance of home and office computers, and with the proliferation of internet service providers, access to all kinds of information can be readily had by a person at either the office or home using a computer, and at the convenience of the subscriber. A subscriber connected to the internet via a telephone line modem and service provider can browse through the various internet data bases, generally at only the cost of a connection to the internet service provider. With regard to internet subscribers, an internet connection is generally accomplished by the modem dialing a local number. The telephone operating companies thus do not obtain revenue therefrom, as such calls are often not of the toll or long distance type. The revenue obtained by the telephone operating companies for internet connections is generally only for leased lines from the internet service provider to the internet connection point. Despite that the local telephone operating companies have had to accommodate the additional load imposed on them for providing telephone connection services, very little, if any, additional revenue has been gained.

The internet architecture includes a government-installed network, termed the "backbone", to which many governmental and educational institutions are directly connected. Accordingly, a vast amount of data and information is easily distributed throughout government and educational institutions by large mainframe computer data bases, without involving private or public telephone companies. In order for individuals and businesses other than those with internet mainframe computers to be connected to the backbone, many service providers, i.e., web sites, have become available for connecting subscribers to the internet. The web sites themselves also employ additional data bases which are accessible by any person wishing to access the internet. Generally, subscribers establish internet connections by dialing via analog modems to a modem "pool" that is served by a computer of the internet service provider. The web site computer then provides a connection appearance to the internet via a high speed leased line ultimately to the internet backbone. Each subscriber has a unique IP address, and each service provider has a unique address, such as mainhost-.Cyberspace.net. In like manner, the address of the service provider is generally known as a domain name server. Similarly, each web site has a unique address, such as http://WWW.UH.edu. As noted above, while the local telephone operating companies do not obtain additional revenues from the subscribers during the connection to the internet, certain revenues are obtained for the high speed leased lines.

With the widespread use of the internet by many individuals using analog modems, substantial traffic burdens have been placed on the public telephone network, in that the local telephone operating company provides a switched network connection for each subscriber to reach the service provider. While such internet connections at the local central office do not involve any technical problems, such connections do indeed reduce the capability of the telephone companies to handle the routine telephone set traffic, especially during peak demand periods. It is well known that the traffic needs of telephone switching equipment are based on the statistical average of routine telephone calls. In practice, an average telephone-to-telephone call lasts approximately 100 seconds. Thus, based on the plain old telephone service (POTS), even at peak demand periods when the switching network may be operating at full capacity, a user does not need to wait for a very long period of time in order to complete a connection through the network to a destination, whether it be local or long distance. However, the telephone network connection provided for an internet subscriber lasts significantly longer than the nominal 100 seconds, and may remain for hours.

A central office connection provided by a local telephone company that is dedicated to a single subscriber for many hours thereby disrupts the statistical traffic demands that are normal for routine telephone calls. While the telephone operating companies can overcome this problem by expanding the central office switching equipment to accommodate more subscriber connections, such solution involves extremely costly equipment, space and time to install new switching equipment.

The information provided to internet subscribers often involves video data in the nature of graphics. In order to recreate pictures or graphical data on a CRT via a standard 28.8 K analog modem, a substantial amount of time is incurred in waiting for the transfer of large amounts of video data, as well as the display of the same on the CRT. This waiting period is due primarily to the bandwidth bottle-neck of the modems. While ISDN data links are available, and operate between 56 and 128 kilobits per second, the use thereof does not significantly overcome the waiting problem.

The bandwidth problem can be overcome by the use of optical fibers that are higher speed and more environmentally durable than the traditional twisted copper pairs. However, the installation of fiber optic transmission facilities is costly, and thus acceptance thereof has been generally limited to high traffic situations. There is, however, a continued growth of the use of fiber optic telecommunications into residential neighborhoods. An emerging technology in this area is called "fiber to the curb." RELTEC Corporation of Bedford, Tex. is a leader in providing this new technology. Even with fiber optic capability extended to residential homes, apartments and businesses, the primary usage thereof is yet for routine telephone calls and computer modem traffic. As such, the fiber optic systems represents excess capabilities that are not used to the fullest extent.

It would be highly advantageous to utilize the high speed optical medium for computer network capabilities, especially in view that many residential homes and/or offices are equipped with computers and modems for accessing the internet as well as a host of other services. The networking of computers is a well-established function that allows a number of computers to communicate with each other according to a predefined protocol. One of the most popular network protocols is the Ethernet protocol, or otherwise known as the IEEE 802.3 standard. While this local area network protocol functions ideally in a local area, it is not easily expanded geographically without the use of expensive "network" bridges. The area limitations of the Ethernet protocol is based primarily on the "round trip timing" of signals carried on the network. This period of time is directly related to the physical length of the network medium and the time delay of electrical signals carried by the medium. According to the Ethernet standards, in order to minimize signal attenuation, each source or destination computer must be no further from the network than about 328 feet. The Ethernet protocol includes an algorithm to detect when two computers attempt to transmit data packets on the network at the same time and avoid the corresponding "collision" of signals. To date, there has been no acceptable solution for extending the geographical area of an Ethernet network without utilizing expensive bridges. While the use of bridges is widely known, such solution involves the receipt of the data packets, decoding the various fields and otherwise processing of the data fields themselves, and the attendant slowing down the transport speed of the overall data transmission.

From the foregoing, it can be seen that a need exists for a technique to provide users with connections to the internet, without tying up local central office switching equipment for long periods of time. A further need exists for the use of conventional equipment and software to provide such connections to internet services, without the need for new or expensive computer equipment or software protocols. Another need exists for a better utilization of fiber optic and other high speed data transmission facilities that are available to residential users. A significant need exists for extending data networks without the use of bridges and similar equipment while yet maintaining conformance to the appropriate protocol. Another need exists for providing an improved utilization of high speed data lines in extended data networks, and providing residential and other users further incentives to use high speed data services.

SUMMARY OF THE INVENTION

In accordance with the principles and concepts of the invention, disclosed is a technique for overcoming or substantially reducing the problems attendant with the traditional connections provided to the internet, via the local telephone operating companies.

In accordance with an important aspect of the invention, rather than employing modem data coupled through the switching fabric of a central office, the subscriber's personal computer employs a conventional network card to generate data packets according to a standard local area network protocol, such as Ethernet. The data packets are thereafter multiplexed with other data packets and converted to corresponding optical signals for transfer via an optical fiber medium to an Ethernet switch or other similar equipment, such as a LAN adapter located in the central office. The central office allows the internet connection request to be switched and/or transferred external to the switching fabric via high speed lines for subsequent connection to the internet backbone. With this arrangement, unlike the traditional modem data, the data packets communicated between the internet and the subscriber personal computer are not carried or switched through the switching fabric of the central office. Thus, lengthy internet connection periods do not adversely affect the voice traffic carrying capability of the central office switching system. Also, by reason of the central office capability of processing internet access requests, the central office can itself function as a service provider, i.e., as a domain name server.

In the preferred embodiments employing the invention, a household or office personal computer is connected to a standard twisted pair having a 10 MHz bandwidth for carrying Ethernet data packets or frames. The data packets are transmitted on the twisted pair at a 10 MHz rate by a 10-Base-T transmission method. Within no more than about 500 feet of home or office personal computers, there is located an optical network unit for converting the digital signals of the Ethernet frames to corresponding optical signals that are carried on a fiber optic line. The optical network unit provides a carrier sense multiple access with collision detection (CSMA/CD) functions with respect to the computer connected to the 10-Base-T input ports thereof. In addition, the optical network unit can include additional ports to convert analog voice signals from telephone sets to PCM signals which are multiplexed with the computer digital data. Other digital carrier capabilities, such as DS1, can also be multiplexed onto the optical medium by the optical network unit. With regard to the data frames transmitted to the optical network unit by the computer, if no collision of signals is detected, then the data packets are stored in a buffer memory and retransmitted back to the other computers locally connected to the 10-Base-T ports of the optical network unit. Moreover, if no collision is detected, the data frame is transmitted as optical signals toward a central office via a host digital terminal. Importantly, a host digital terminal can be located several miles or more from an optical network unit, and can receive optical inputs from a number of such units.

The host digital terminal may typically be located remotely with respect to the central office and coupled thereto by yet other optical fiber or electrical data transmission lines. Much like the optical network units, the host digital terminal includes plural optical interface units that receive the network data frames and provide a collision avoidance function. As such, the network connection is extended from the residences beyond the traditional geographical limits, to the host digital terminal.

Each optical interface unit of the host digital terminal is interconnected by a common high speed electrical bus to provide networking of data frames therebetween so that such frames can be transmitted back to all of the other computers connected in a wide area network. In addition to the echoing of the data frames to the sources, and if no collision is detected, the data frame is read from a buffer memory and transmitted to a standard Ethernet switch where such data is transferred on a high speed line toward the internet backbone. The host digital terminal also transfers the multiplexed optical signals of PCM and DS1 data by way of fiber optic cables or electrical lines to the central office where the signals are reconverted to bipolar signals. The PCM data is switched by the switching fabric of the central office to a destination in a conventional manner.

In various other alternatives in the practice of the invention, there may be intermediate conversions and reconversions of optical signals to 10-Base-T signals before arriving at the central office. In addition, various multiplexing and de-multiplexing of the optical signals can be carried out to increase the efficiency and throughput of the system.

In accordance with another feature of the invention, the host digital terminal is adapted for separating digitized PCM voice signals originating from the subscriber's telephone sets, from the data packets generated by the subscriber's personal computer, whereby the digitized voice signals are routed to the central office for switching via the switch fabric, and the data packets bypass the switching fabric and are routed to the internet bridge.

In accordance with yet another feature of the invention, the data packets generated by the subscriber's computer are preferably those that comply with the Ethernet protocol. In this manner, standard commercial personal computer software and hardware can be utilized to transmit and receive the Ethernet data packets at a 10 MHz rate, without employing any new personal computer software or hardware. By carrying out the internet bidirectional communications via Ethernet data packets, the response time to the subscriber in receiving large masses of internet information, such as multimedia information, is substantially facilitated, as compared to the traditional 28.8 K data rate of a personal computer modem.

BRIEF DESCRIPTION OF THE DRAWINGS

Further features and advantages will become apparent from the following and more particular description of the, preferred embodiments of the invention, as illustrated in the accompanying drawings in which like reference characters generally refer to the same parts or elements throughout the views, and in which:

FIG. 6 is a detailed block diagram of the major components of an optical interface unit;

FIG. 7 is a block diagram of the major components of one channel of the optical channel shelf;

DETAILED DESCRIPTION OF THE INVENTION

Conventional Internet Connection

Figure 1:
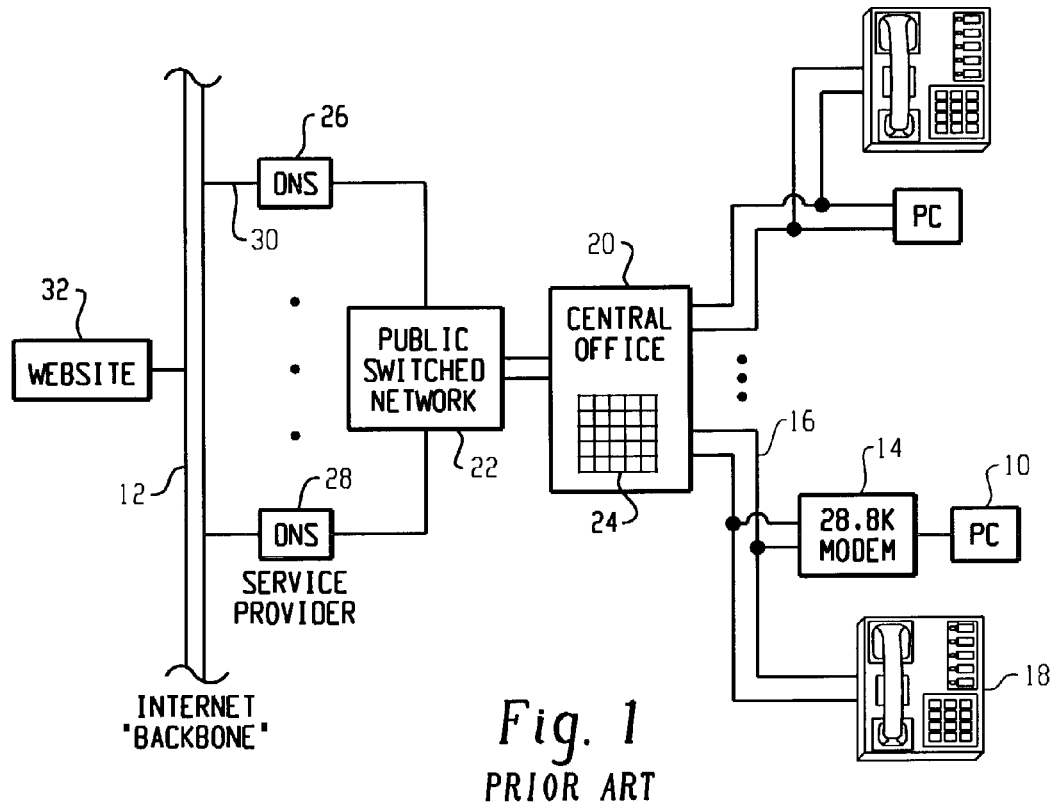
FIG. 1 illustrates in block diagram form the rudimentary communication path through the switching fabric of a central office switching system for connecting a subscriber to the internet.

The various aspects of the invention are best understood by comparison with the current technique for connecting a subscriber to the internet network, as shown in FIG. 1. Although many different variations of the network connection exist in actual practice, FIG. 1 is illustrative of the manner in which a user having a personal computer 10, or the like, is connected via different telecommunications systems and computers to the internet backbone, designated as reference numeral 12. Typically, the user's computer 10 is coupled by way of a modem 14 to a conventional 24-26 gauge twisted pair telephone line 16, as is the subscriber's telephone set 18. Either the user or the user's personal computer 10 is dynamically assigned a unique IP address when the subscriber is registered or otherwise authorized to access the internet 12. The modems 14 in widespread use are generally capable of transferring data at a baud rate of about 28.8 K bits per second. Accordingly, even though the subscriber line 16 is capable of transmitting data at a rate of 10 MHz, such data rate cannot be realized because it is limited to the lower baud rate of the analog modem 14 and intervening channel card CODEC circuits and corresponding filters. The computer modem 14 converts a serial digital data stream generated by the computer 10 into corresponding QAM analog signals transferred over the telephone line 16 to a local central office 20. The standard telephone line 16 has tip and ring conductors that are twisted together. It is a common practice in the installation of telecommunication services to a household or business to install at least two or more twisted pairs, even if only a single pair is to be utilized. As can be appreciated, a telephone line 16 can only be utilized at one time by either the computer 10 or the telephone set 18.

The central office 20 is a switching system operated by a local telephone company for serving numerous residential and business customers with telephone and other telecommunication services. Indeed, and while not shown, the central office 20 is connected to other central offices by trunks, as well as to other toll switching systems for carrying toll-type telephone traffic. The various and sundry other communication services and equipment is denoted in FIG. 1 as the public switched network 22.

With regard to the local central office 20, whether the communication traffic is transported by way of telephone sets 18 or computers 10, such traffic is switched through the switching fabric 24 and therefrom to either a local or remote destination. The switching fabric 24 can constitute a wide variety of apparatus adapted for providing an electrical connection between the subscriber and the destination for as long as the subscriber is off-hook and using the telephone line 16. The connection afforded by the switching fabric 24 can be maintained for as few as several seconds for short voice communications using the telephone set 18, or many hours, which is typical of subscribers using personal computers 10 to access the internet 12. The actual connection in the switching fabric 24 can be either by way of relays or other similar switches, as is common in step-by-step, panel and cross-bar type of central offices, or can be electronically switched such as in the time division multiplexed switching fabrics of electronic switching systems. Irrespective of the utilization of either space or time-switching fabrics 24 employed by the specific type of central office 20, the switching connection is dedicated to the user, and only to that user, for so long as the subscriber is communicating with the destination.

The traffic load of a central office switching system 20 is dependant upon the number of subscribers and a host of other parameters that are statistically considered to entitle the various users the fulfillment of communication needs without having to wait before being allocated usage thereof. The telephone traffic patterns have in the past anticipated that the majority of calls would be those initiated by telephone sets 18, and which last statistically on an average of about 100 seconds. However, with the widespread use of modems 14 and computers 10 in both the residential and business environments, the time that each subscriber utilizes the services of the switching system 20, and thus the switching fabric 24, has increased substantially, thereby placing severe burdens on the traffic capacity of the central offices 20. As noted above, one way to resolve this burden is to expand the capacity of the switching fabric 24 of the central office, or add additional central office switching equipment, both options of which are extremely expensive. As set forth more fully below, the present invention not only provides user connections to the internet without burdening the switching fabric 24, but the information transferred between the user and the internet is at a much higher speed and therefore the response time as seen by the subscriber is much faster.

With reference again to the establishing of a connection to the internet backbone 12, shown in FIG. 1, the public switched network 22 provides a connection to the specific service provider 26-28, depending upon which provider the subscriber has paid for such services. Each service provider has a domain name which, when input into the computer 10 by the subscriber, uniquely identifies the particular service provider through which access to the internet 12 can be obtained. The domain name may be in the nature of "mainhost.abcde.net", which allows the public switched network to route the subscriber to the particular service provider. The service provider 26-28 will verify that the subscriber is authorized to access the internet, by verifying the user name, password and MAC layer address of the computer 10, as imbedded in the Ethernet LAN card.

After confirming that the subscriber is authorized to access the internet 12, the particular service provider 26 accesses a web site 32 by way of a dedicated leased communication line 30 and the internet backbone 12. The web site 32 can be a government office, a university, a business, etc. that has a direct connection to the internet backbone 12. In the event the web site 32 is a university, the address thereof may be in the nature of "http://www.efg.edu." The foregoing is an example of the equipment and systems employed in completing a bidirectional communication channel between the computer 10 of the subscriber and the internet 12.

Generally, access requests dispatched from the computer 10 are short commands, whereas the information transferred from the internet 12 to the computer 10 can be substantial volumes of data, which may include video, text, etc. In order to transfer large volumes of data and to reproduce the same on the monitor or CRT of the computer 10, certain time delays are involved. The time delays are primarily a result of the speed of the modem 14, which by today's is a 28.8 K baud rate. It is not uncommon for time periods of 10-30 seconds to elapse between the request of information from the internet 12, and the corresponding display thereof to the subscriber.

As can be appreciated, there currently exists no type of arrangement where computer equipment can be networked together, except with the traditional LAN protocols. As noted above, such protocols generally impose an area limitation on the network connections to preserve the collision avoidance algorithms. Moreover, to extend high speed data lines, like fiber to the curb, such service would not be highly cost effective, as the telephone line and modem equipment do not presently warrant such a high speed and expensive connections. The utilization of the present invention provides the incentive to provide fiber to the curb telecommunication services.

Switching Fabric Bypass of Internet Connections

Figure 2:
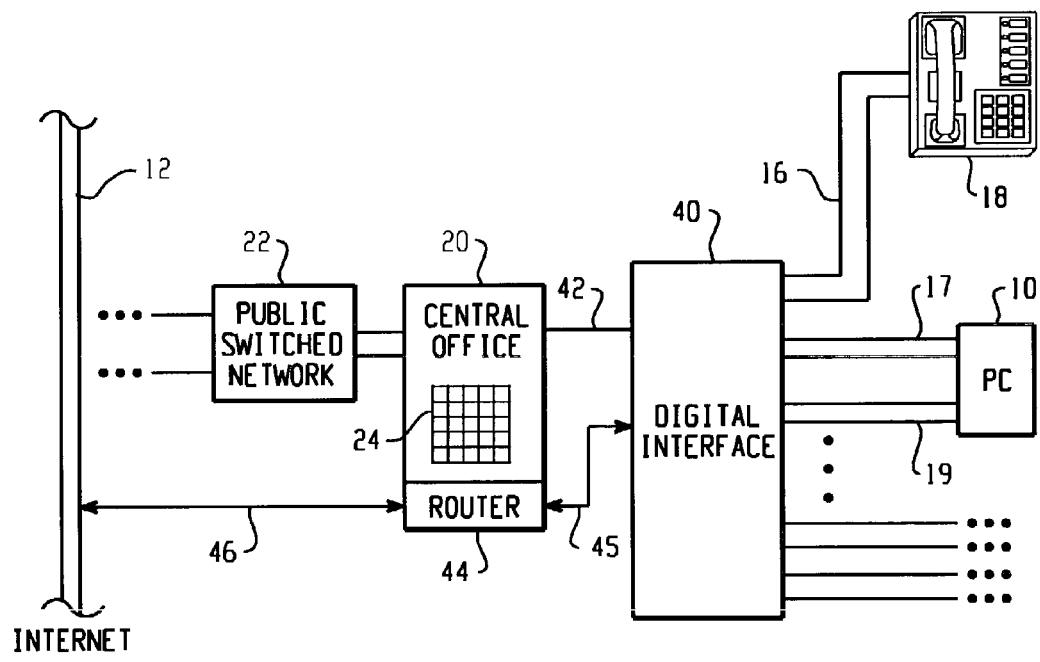
FIG. 2 illustrates in block diagram form shows the connection of a subscriber to the internet without tying up the switching fabric of the central office.

With reference to FIG. 2, there is depicted in generalized block diagram form a technique for connecting a computer 10 to the internet 12 without involving the switching fabric 24 of the central office 20. A digital interface system 40 is preferably located within about 500 feet (as per the Bellcore TR-909 standard) from the residence or office housing the computer 10 and telephone set 18 so as to be connected by standard twisted pair telephone conductors that can accommodate 10-Base-T transmission. The telephone set 18 is connected by one standard telephone pair 16, while the computer 10 is connected to the digital interface 40 by differential transmit and receive pairs 17 and 19. The digital interface 40 serves to provide conversion of analog signals to corresponding digital signals, on-hook, off-hook and other signaling, alarm and maintenance, and digital communications of voice-signals with the central office 20 by way of a digital carrier 42, such as the standard T1 or other carrier system. In addition, the digital interface 40 provides a connection between the personal computer 10 and the internet 12 by way of an Ethernet switch or router 44 and other standard high speed digital lines 46. While not shown, the digital line 46 will be interconnected by way of one or more leased lines dedicated to the service provider solely for internet use. Such lines 46 are standard equipment presently used for connecting subscribers to the internet backbone 12. The digital information transferred between the interface 40 and the internet router 44 on path 45 can be by way of electrical or optical signals. Moreover, the signals carried on path 45 can be packets of data, such as generated according to the Ethernet protocol, or other hybrid technologies such as HDSL or ADSL to provide LAN connection to and from the subscriber. Importantly, other digital equipment, such as other computers can be networked together using the digital interface 40. Indeed, by employing the techniques described in detail below, the Ethernet protocol can yet be employed, as well as all the standard Ethernet equipment, but the geographical area of LAN connections can be greatly expanded.

In brief operation, the digital interface 40 couples all communications received by the telephone set 18 on the subscriber line 16 and directed to the central office 20, in the standard manner for switching via the fabric 24 to a destination. On the other hand, the digital interface 40 receives access commands on the twisted pair transmit line 17 connected to the computer 10, and transmits data packets to the computer 10 on the twisted pair receive line 19. When the digital interface 40 receives the access command, such request is initially transferred via the digital line 45 to the central office 20, to a domain name server, which determines whether the computer 10 is authorized for access to the internet services 12. If so, the central office signals the digital interface 40 by way of the digital lines 45, whereupon the interface 40 provides a connection between the computer 10 and the internet leased line 46. In this manner, the computer 10 is connected to the internet services 12 without hampering or otherwise impeding the usage of the switching fabric 24 of the central office 20 for voice and other standard communications.

In accordance with an important feature of the invention, the digital interface 40 preferably comprises a host digital terminal (HDT) coupled to an optical network unit (ONU) by way of an optical fiber to provide a large bandwidth usable by numerous subscribers serviced by the digital interface 40. In view that the standard telephone conductor pairs 17 and 19 are capable of carrying 10 MHz digital signals, the optical fiber circuits do not present a bottleneck for such signals, even when plural users connected to the digital interface 40 are accessing the internet services 12 at the same time. More preferably, two twisted pairs 17 and 19 are employed to provide high speed differential transmit and differential receive Ethernet LAN capabilities to the subscriber computer 10. The usage of an additional transmission pair does not normally involve an impediment, as more than one twisted pair are generally installed at the residence or business office.

In accordance with another important feature of the present invention, a modem 14 is not required in the practice of the present invention. Rather, and to be described in more detail below, Ethernet transmission control protocol (TCP/IP) packets or internet protocol exchange (IPX) packets of data are employed in transmitting requests, instructions, commands, data, etc. between the subscriber computer 10 and the internet 12. Both the host digital terminal and the optical network unit can be spaced apart a distance far greater than the 328 feet spacing previously limited by signal attenuation concerns. In addition, both the HDT and the ONU employ collision avoidance algorithm, as well as data packet buffer memories to provide networking of the data packets between all the plural ONU's, without using the conventional Ethernet bridges.

As an alternative to the utilization of fiber optic circuits, and as noted above, specialized hybrid transport technologies, such as HDSL or ADSL can be employed. Set forth below is another embodiment of the invention in which the local area network is extended several hundred miles between two network extenders using a DS1 line. Indeed, the primary transport of universal data according to the invention is by way of standard Ethernet packets generated and received directly by the subscriber computer 10. By employing the Ethernet TCP/IP or IPX packet transport protocol, or other types of well-known data packet transmission protocols, the cost to the subscriber is minimal, as such technology is already well developed and commercially available. As will be set forth more fully below, the digital interface 40 functions to extend transmission of the LAN packet data without utilizing an expensive Ethernet or other type of bridge.

In order to accommodate the advantages of the invention, an Ethernet LAN interface card, or other LAN protocol cards that are readily available on the market, are simply installed in the subscriber computer 10. The required software or "protocol stack" and network service/client functions are already integrated into popular personal computer operating systems, such as the Windows and Macintosh operating systems. Accordingly, the subscriber need only purchase a low cost LAN interface card, and in most likelihood, no special or proprietary software is required as many subscriber computers 10 already employ operating systems that support the Ethernet LAN packet transport protocol.

Figure 3:
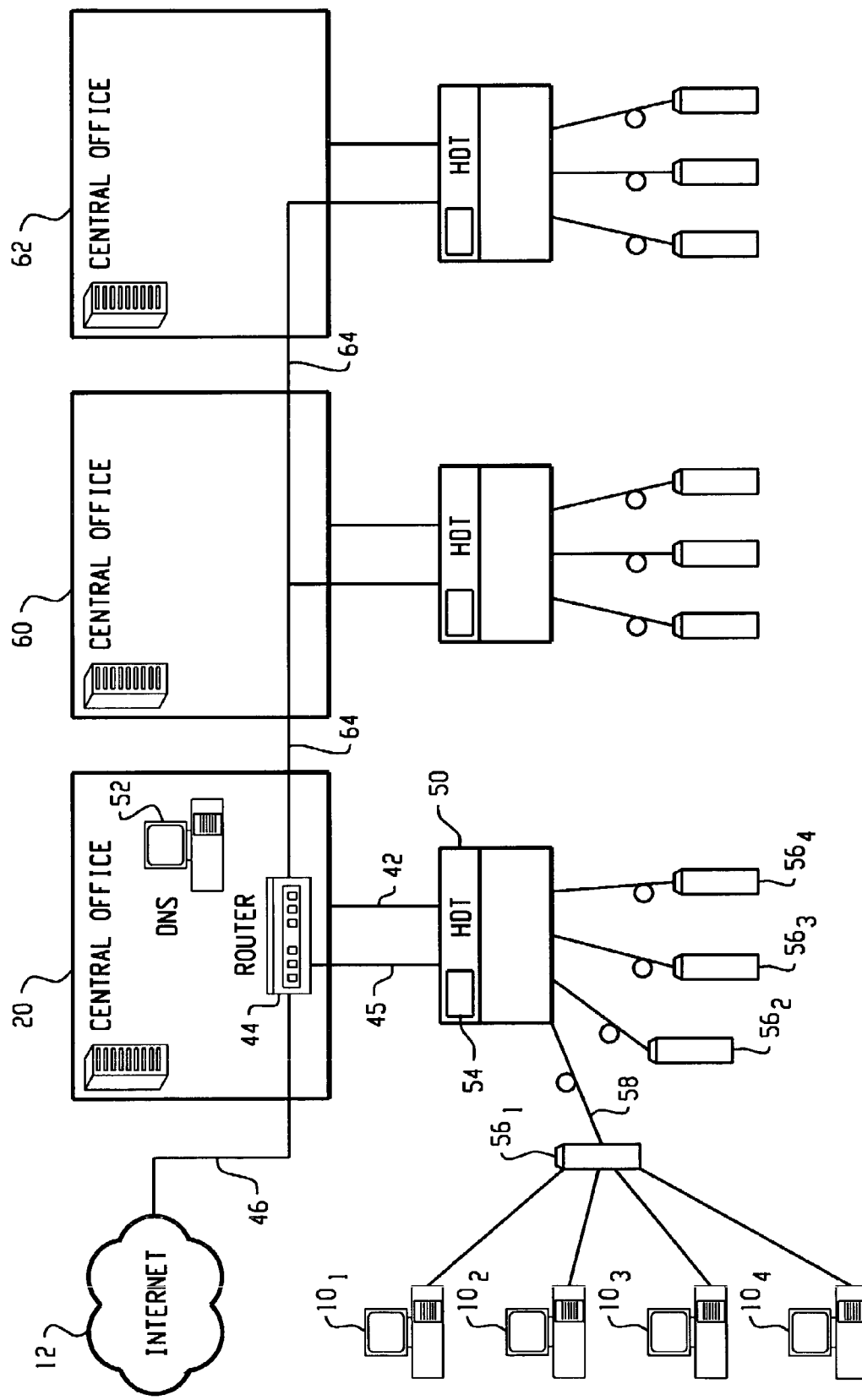
FIG. 3 is a more detailed block diagram of the internet connection path, according to one embodiment of the invention.

FIG. 3 illustrates in more detail the various features of the digital interface 40, which comprises a host digital terminal 50 connected to the central office router 44 by way of the digital line 45. In the preferred embodiment of the invention, the host digital terminal 50 can comprise a DISC*S host digital terminal, obtainable from RELTEC Corporation, Bedford, Tex. Such equipment is conventionally available for providing the transport of PCM voice signals to the central office 20 via a digital line 42. The DISC*S FITL (fiber in the loop) equipment configured with a DISC*S ONU provides fiber to the curb capabilities. When modified to provide distributed hub capabilities, as described below, a highly versatile system is achieved. The host digital terminal 50 can be connected via the router 44 to the domain name server 52 which may be also located within the central office 20. The internet router 44 can be coupled to other central offices, such as noted in FIG. 3, by dedicated T1 or higher speed inter-office links. The internet router 44 is connected by a high speed connection, via a dedicated data link 46, to provide a connection appearance to the internet via high speed leased lines. While not shown, the connection appearance to the internet 12 is by way of other high speed leased lines which ultimately connect to the internet "backbone."

Each host digital terminal 50 includes digital carrier equipment for transporting digitized PCM voice signals and Ethernet data packets to the switching system 20 via the respective digital carrier lines 42 and 45. Those skilled in the art may find that both the PCM, DS1 and PC data packets can be efficiently multiplexed together and transported on a single line to the central office 20, where such signals are then separated from each other. The host digital terminal 50 can serve one or more optical interface units 54 to provide an optical-electrical and electrical-optical interface between the host digital terminal 50 and the digital transmission lines 42 and 45. The host digital terminal 50 is also connected to one or more optical network units 56 by a respective optical fiber 58. Based on the statistical usage data or the traffic expected with respect to each optical network unit 56, each such unit is contemplated to provide service to at least four computers 10. In addition, it is contemplated that each optical network unit 56 can provide service to about twelve telephone sets. When utilized for residential connections, the optical network unit 56 is located within about five hundred feet of the respective residences in accordance with the Bellcore TR-909 standard so that two twisted pair cables can be connected to each computer 10. In like manner, each telephone set is connected to the optical network unit 56 by a single standard telephone twisted pair. The length of the optical fiber 58 is expected to be no longer than about 12,000 feet, without repeaters. Thus, the radius of networked connections with respect to each host digital terminal 50 is about 12,000 feet, as compared to the Ethernet standard of 328 feet.

The other central offices 60 and 62 can be similarly connected to respective host digital terminals and optical network units to thereby provide communication services to numerous other residences or businesses. Each central office is connected by a dedicated DS1 (1.544 MHz) or higher speed inter-office link 64 to the router 44 of the central office 20 having situated therein the domain name server 52. Hence, in a connection of any computer 10 to any of the central offices 20, 60 and 62, the LAN packet information can be transferred to and from the internet 12 without involving the switching fabric of any of the central offices. In this manner, subscribers can fully utilize the information dispersal of the internet, without tying up or otherwise increasing the load on the central office switching systems.

Equally important, each computer $10_1$-$10_4$ is connected together with the Ethernet protocol by the optical network unit $56_1$, as well as to the computers (not shown) associated with the other optical network units $56_2$-$56_4$. As will be explained below, the host digital terminal 50 provides an additional level of networking between each of the optical network units $56_1$-$56_4$ so that all computers are networked together and collision avoidance protection is provided. This arrangement thereby provides a distributed hub function to geographically extend the Ethernet network without the use of bridges.

Figure 4:
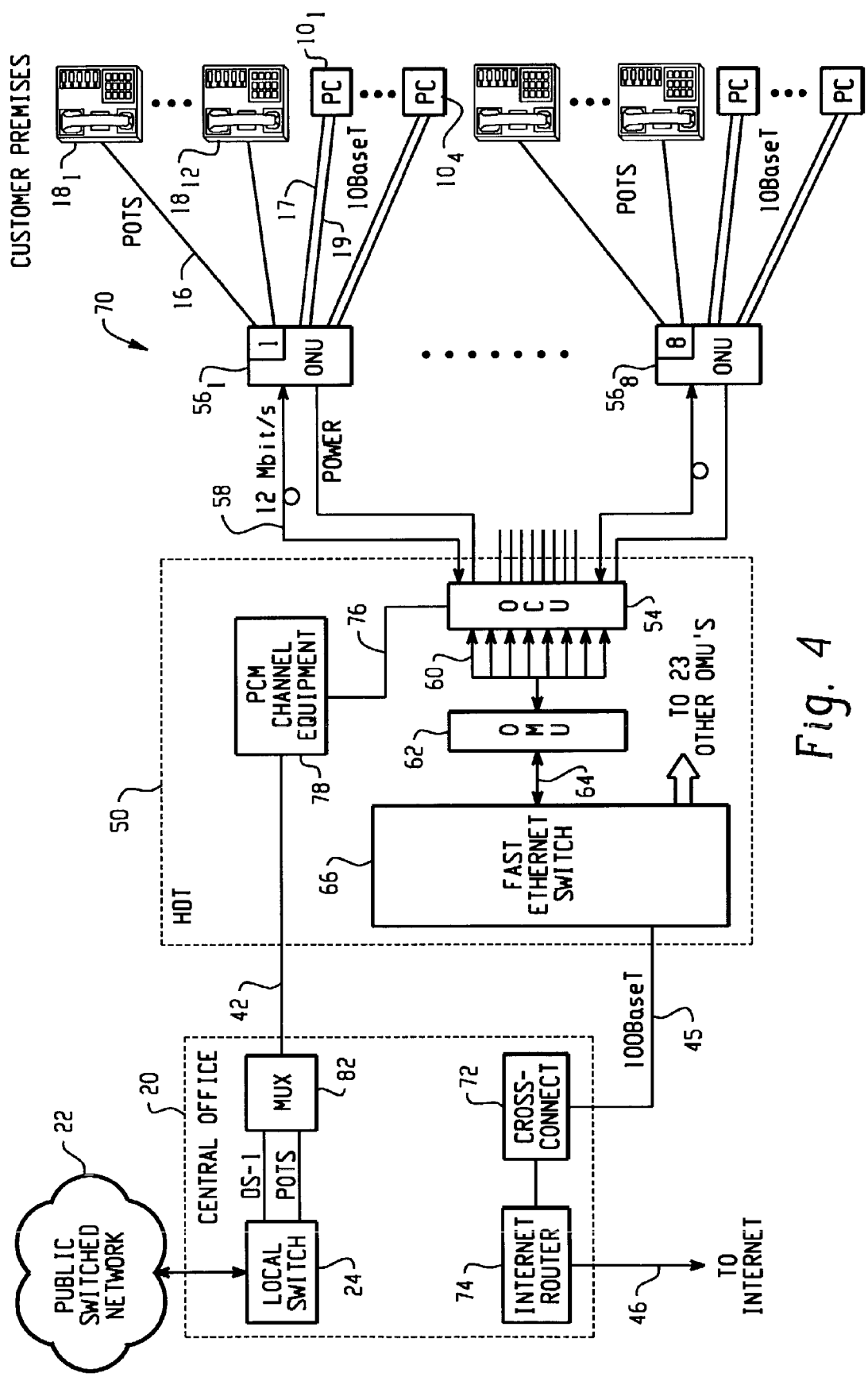
FIG. 4 is a more detailed diagram of the transmission path and the apparatus for carrying high speed data packets and PCM voice information between subscribers and a local central office.

FIG. 4 is a more detailed diagram showing the central office 20, the host digital terminal 50 and the optical network units 56 of FIG. 3. Each host digital terminal 50 can support a group 70 of optical network units 56. In the preferred embodiment of the invention, and due particularly to the hardware architecture design, the host digital terminal 50 is equipped to support eight optical network units 56, each of which can, in turn, support twelve telephone sets 18 and four personal computers 10. In this configuration, a single host digital terminal 50 can provide telephone service to ninety-six telephone sets and can provide Ethernet hub connections between thirty-two computers. Again, the number of telephone sets and personal computers supported by a single optical network unit 56 is solely dependent upon the equipment and the nature of the subscribers, the expected peak usage and other parameters. While telephone sets and computers are disclosed as the typical equipment connected to the optical network units 56, the invention can provide the full advantages thereof when utilized with other devices or equipment. Although each telephone set 18 and each personal computer 10 can be connected to the optical network unit 56 by standard twisted pairs, such conductors are dedicated on the respective I/O ports of the optical network unit 56 to either telephone sets or to computers 10. In other words, the twelve (or twenty-four) twisted pairs coupled to a first type of optical network unit port can serve only telephone sets 18, and an additional eight twisted pairs connected to an Ethernet I/O port can only support differential transmit and receive data packets of four personal computers. In this manner, based on which twisted pair is active (i.e., off-hook), the optical network unit 56 can readily identify whether the electrical signals coupled thereon are from a personal computer 10 or from a telephone set 18. Indeed, subscribers and other users can nonetheless utilize a standard modem connected to the subscriber telephone line 16 and transmit and/or receive modulated QAM signals via the optical network unit 56 and to the central office 20 for switching through the fabric 24 in a conventional manner. In this event, the optical network unit 56 treats the computer FSK signals in the same manner as that from any telephone set 18. As will be described in more detail below, each optical network unit 56 employs integrated circuits for switching or otherwise transferring data packets according to the Ethernet protocol.

In the preferred embodiment, the optical network units provide fiber optic transmission capability in accordance with the Bellcore TR-909 standard. Preferably, each pedestal optical network unit services customers, whether residential, apartment, business, etc, when within about 500 feet thereof. Standard 22 gauge twisted pair conductors suitable for carrying 10 Mb/s data can provide pots and digital service to each subscriber in the locale of the optical network unit.

Each optical network unit 56 further includes conventional digital channel units having CODECs for converting analog voice signals to corresponding digital signals, and vice versa, for allowing voice communications between the telephone sets 18 and a dialed destination. While not shown in FIG. 1, optical and electrical circuits also constitute a part of each optical network unit 56 to convert PCM voice data originating as analog signals from the telephone sets 18, and digital packet data from the computers 10 into corresponding optical signals, and vice versa. The optical signals are carried on a fiber 58 to an optical channel shelf 54 located in the host digital terminal 50. Although the optical fiber 58 is capable of carrying high bandwidth signals, it is contemplated that in the embodiment of FIG. 4, a 12 megabit per second optical data rate is sufficient to accommodate the traffic expected by twelve to twenty-four telephone sets and four personal computers. As will be described more fully below, each optical network unit 56 is equipped with circuits for transporting transmit/receive data packets of the Ethernet protocol, between any of the computers associated with the unit and to the host digital. The host digital terminal 50 provides LAN network capabilities between each of the optical network units. moreover, each optical network unit and the host digital terminal are provided with collision detection capabilities to coordinate the transmit/receive data packets according to the Ethernet protocol. This networking of the computer 10 is carried out efficiently and reliably despite that the 10-Base-T lines may be up to 500 feet long and the fiber optic line 58 may extend up to above 12,000 feet without the use of optical repeaters.

The optical channel shelf 54 in the host digital terminal 50 includes eight substantially identical channels, each optical channel associated with a corresponding optical network unit 56. The optical signals of each channel are converted to corresponding electrical signals. The optical channel shelf separates the PCM and any DS1 signals from the PC data packets, and passes the PCM and DS1 signals to the central office 20. The PC data packets are temporarily stored in a respective buffer memory. Each channel unit includes a circuit that provides collision avoidance of the data packets transmitted to or received by such channel unit. If a high speed bidirectional data bus 60 is idle, then one channel unit will place a data packet thereon for receipt by each of the other seven channel units. In this manner, each of the other seven channel units can temporarily store the received data packet and retransmit it back to the respective optical network unit, where it will then be transmitted and echoed to each of the four computers 10. Once the data packet is placed on the high speed bus 60, the optical maintenance unit 62 temporarily stores the data packet and checks for potential collision avoidance with a 10-Base-T bus 64 connected to one of twenty-four ports of a Fast Ethernet switch or other similar Ethernet switching equipment. The Fast Ethernet switch 66 is conventionally available for combining plural 10-Base-T inputs and for coupling a pair of 100-Base-T lines 68 to the local central office 20. As noted above, the optical channel shelf functions to separate the PCM voice signals from the computer data packets. The data packet information is routed to the central office and is separately switched or otherwise routed so as to avoid being coupled to the switching fabric, identified as the "local switch" in FIG. 4.

As noted above, Ethernet LAN cards are conventionally available for many type of computers, as is the protocol stack that merges the Ethernet protocol with the TCP/IP or IPX packets for accessing the internet. Accordingly, the Ethernet TCP/IP or IPX data packets are generated at the personal computers 10 and carried either as optical or electrical signals to the central office 20. It is important to note that in accordance with an important feature of the invention, the optical network units 70 and the optical channel units 54 only transport the transmit/receive data packets, but do not decode the various fields and carry out processing thereof, as do conventional Ethernet bridges. As such, the switching and transport speed of the data packets through the circuits of the invention are significantly enhanced.

With reference again to the Ethernet switch 66, the multiplex data packets are transferred on the 100 Mbit/s line 68 to the central office, and then to other cross-connect or interface equipment 72. From the cross-connect interface 72, the signals are transferred to an internet router 74, and therefrom to the internet by a downstream high speed line 46. As can be appreciated, not only are the data packets networked between the various computers by the distributed hub, but such data also bypasses the switching fabric of the central office 20. While not shown, the central office may also be equipped with one or more domain name servers so that the central office can function as an internet service provider.

With reference back to the host digital terminal 50, it is noted that the PCM voice data is separated from the data packets by circuits in the optical channel unit 54. In view that each telephone set 18 and each computer 10 has a dedicated input/output port on the optical network unit 56, such information is readily identified as to source, and thus can be multiplexed into specified time slots of a transmission frame. The specific time slot and framing format utilized is not a part of the present invention, as many different framing formats and protocols can be employed by those skilled in the art. In any event, based on the PCM voice signals and any DS1 data received by the optical channel unit 54 from the respective optical network units 56, such data is separated and coupled on a PCM bus to PCM channel equipment 78, or other PCM equipment adapted for transmitting such type of data. In the preferred embodiment of the invention, the PCM channel equipment may include DISC*S HDT equipment obtainable from RELTEC Corporation, Bedford, Tex. In any event, the PCM data is coupled from the host digital terminal 50 to the central office 20 by way of a DS1, optical or other type of transmission line 42. The PCM voice data is processed by the central office 20 by way of a multiplexer or other type of interface 82 and coupled to the public switched network 22 by way of the local switch fabric 24.

Optical Interface Units—Distributed Hub

Figure 5:
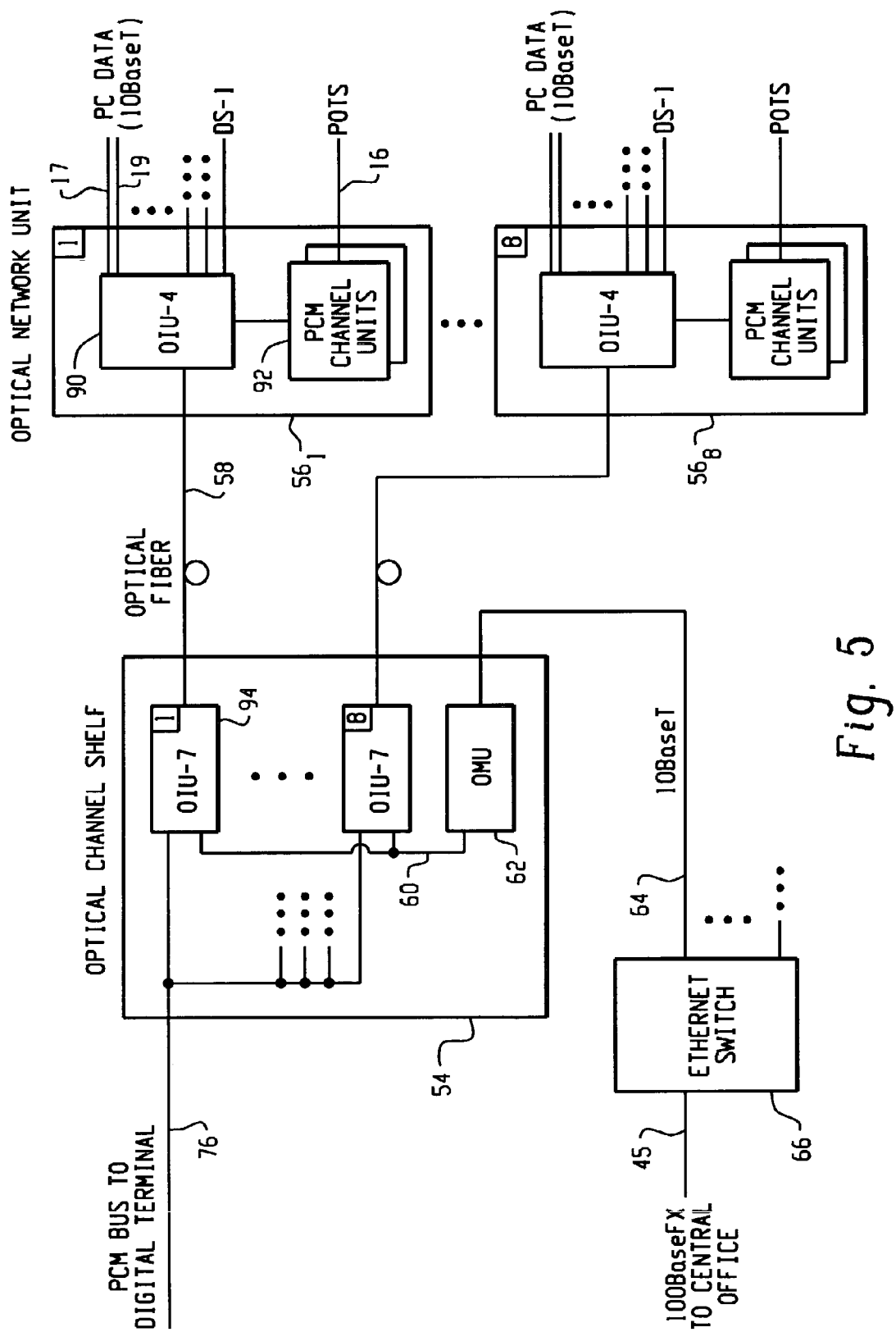
FIG. 5 is a block diagram of the optical interface unit as coupled by a fiber optic line to an optical channel shelf.

In order to better understand the structure and operation of the distributed hub according to the invention, reference is made to FIG. 5. Shown is the distributed hub architecture constructed according to the preferred embodiment of the invention. There are shown eight optical network units 56, each equipped with optical interface circuits 90 providing four ports for personal computer (PC) data packets and one port for a DS1 digital line. The optical interface circuits 90 are connected to respective PCM channel units 92 for converting analog signals received on the subscriber telephone line 16 to corresponding PCM digital signals. The PCM channel unit 92 can typically accommodate 12 to 24 voice grade telephone lines. The optical interface unit 90 receives the PC data packets from the four computer lines, the digital signals from the DS1 line and the PCM signals from the telephone lines and multiplexes the same according to a predefined scheme as optical signals on the twelve Mbit/s optical fiber line 58. As noted above, based on the particular port in which the analog or digital signals are coupled to the optical network unit 56, such signals are identified thereby and multiplexed in prescribed time slots, as optical signals on the fiber line 58. While not shown, the optical interface circuits 90 include a standard Ethernet hub repeater circuit with four ports for networking the PC data packets between the four computers connected thereto. Other circuits in the optical interface circuit 90 are programmed to provide collision detection and avoidance between data packets received on the optical fiber 58 and PC data packets received from the hub repeater circuit. With this arrangement, each computer connected to a particular optical network unit 56 is networked together, and in addition PC data packets can be transmitted and received from the optical channel shelf 54 to the particular optical network unit 56. It can be appreciated that the circuits in the optical network unit 56 effectively extend the hub function to the optical channel shelf. Each of the eight optical network units operate in an identical manner for networking the PC data packets to the computers connected thereto, as well as extending the data packets to a respective circuit in the optical channel shelf 54. The data rate on any one of the differential transmit or receive computer lines can be transported at a 10 Mbit/s rate. However, the transmit and receive data rate on the optical fiber 58 is 12.352 Mbit/s. While only a single optical fiber 58 is shown, those skilled in the art may readily utilize one fiber for transmit functions and another fiber for receive functions.

An additional layer or level of networking of the PC data packets is provided in the optical channel shelf 54. Here, eight substantially identical optical interface units 94 have at least one optical port for transporting transmit/receive optical data from the associated optical network unit 56. In addition, each optical interface circuit 94 is coupled together by a wired-OR 10 Mbit/s data bus 60. In practice, the data bus 60 comprises a 4-bit transmit bus and a 4-bit receive bus, where eight bits of transmit data can be transported in a single clock cycle, and eight bits of receive data can be transferred in a single cycle. A PCM data bus 76 is also connected to each of the optical interface circuits 94 for coupling the PCM voice data separated by each circuit from the data packets. The PCM bus 76 also carries the DS1 signals that are separated from the computer data packets by the optical interface circuits 94. Accordingly, the optical channel shelf 54 functions to separate the computer PC data packets from the other digital signals that are coupled to the local central office or other type of telecommunication switching system for further transfer and switching according to conventional techniques.

Each optical interface circuit 94 of the channel shelf 54 includes a buffer memory and collision detection/avoidance circuits that function to prevent the simultaneous use of the respective buses. In operation, each optical interface circuit 94 checks the idle status of both the data bus 60 as well as the electrical digital signals converted from optical signals from the optical line 58 to determine whether the respective bus is busy so that a data packet received on one bus can be transmitted to the other bus. It is significant to note that any one of the eight optical interface circuits 94 can only transmit on the data bus 60 at the same instance, and only when such bus is not also being used for transmission of data packets by the optical maintenance unit 62. It is also important to understand that when any one of the optical interface circuits 94, or the optical maintenance units 62, transmits a PC data packet on the data bus 60, such data packet is received by the other seven optical interface circuits 94, converted to corresponding optical signals and transmitted on the respective fiber to the associated optical network unit 56. Each optical interface circuit 90 of the respective optical network unit 56 receives the data packet, verifies the idle nature of the line, and then retransmits the data packet to the various computer connected thereto. As can be appreciated, any data packet transmitted by any one computer is received by all the other computers by way of the distributed hub shown in FIG. 5.

With regard to any data packet placed on the data bus 60 by any one of the optical interface circuits 94, the optical maintenance unit 62 also temporarily stores such data packet, checks for the idle nature of the 10-Base-T line 64, and if idle retransmits the data packet on such line to the Ethernet switch 66. Again, it can be seen that the optical maintenance unit 62 provides yet another layer or level of collision detection/avoidance for the transport of the data packets between the optical channel shelf 54 and the Ethernet switch 66. Accordingly, in addition to the networking of the data packets between each of the computers, any data packet transmitted by any of the computers is received by the Ethernet switch and transferred on the 100 Mbit/s line 45. In the preferred embodiment of the invention, the line 45 is extended to a central office for subsequent routing to the internet. However, the data packets can be processed or otherwise routed to other destinations in any manner desired by those skilled in the art.

While the distributed hub shown in FIG. 5 includes circuits for integrating PCM voice data and DS1 signals with computer data packets, such integration is not a necessity. Those skilled in the art may find that the distributed hub can be employed solely for carrying Ethernet data packets in a network fashion over a geographical area significantly larger than anticipated by the IEEE 802.3 standard. In practice, it has been found that when the invention is employed as shown for accessing the internet, a 1 Mbyte file can be downloaded from the internet in about one second, as compared to five to fifteen minutes when using a 28.8 Kb/s modem. Moreover, and as noted above, while higher speed lines and data modems can be employed, the access speed can be improved, but networking capabilities are not readily achievable or available. It should also be noted that while the preferred embodiment provides a distributed networking capability using the Ethernet protocol, the principles and concepts of the invention can be employed with equal effectiveness with other types of network protocols.

FIG. 6 illustrates in block diagram form the major functional circuits of the optical interface circuit 90 that is part of the optical network unit 56 of of FIG. 5. The optical interface circuit 90 includes a field programmable gate array chip 100 having three general I/O digital ports. The digital signals carried by each of the three electrical digital ports are multiplexed together according to a predefined framing format, and converted to corresponding optical signals for transport on the optical fiber line 58. The first digital port 102 transports DS1 digital signals processed by a line interface unit 104. The line interface unit 104 transmits and receives digital signals from DS1 lines 106 and processes the asynchronous signals to identify the various frames of data, to stuff bits into various time slots based on the number of digital zeroes encountered, and carries out other routine functions that are well known by those skilled in the art. Secondly, the gate array chip 100 includes PCM buses 108 for transmitting and receiving serial PCM bits from the PCM channel unit 92 of FIG. 5. Lastly, the gate array chip 100 includes a third digital port 110 coupled to the serial I/O data port of a conventional hub repeater chip 112. The hub repeater chip is a standard 20 MHz device having at least four differential I/O ports for connection by 10-Base-T lines to respective personal computers. Hub repeater chips of such type LXT914 (Level One, Inc.), are conventionally available. Importantly, the hub repeater chip 112 provides Ethernet hub functions according to the standard IEEE 802.3 protocol. In other words, the hub repeater chip 112 determines the idle status of the I/O line 110 and the four differential inputs to determine if a data transmission can take place and thus to provide collision detection/avoidance functions. As is common with such type of chip, the data transmitted by a computer on any one of the four differential inputs is echoed to the other three differential inputs to thereby network the data packets. In addition, the data packets (or frames) are transported to the gate array chip 100 on the serial line 110.

As will be described in more detail below, the gate array chip 100 includes a static RAM 114 for temporarily storing all the PC digital packet data that is either transmitted by or received from the serial port 110 of the chip. As noted above, data packets, PCM data and DS1 data found to be transferrable by the gate array chip 100 toward the optical fiber 58 are multiplexed in a predefined format and transmitted as electrical signals to a laser driver 116 and converted to optical signals. The optical signals corresponding to the data are transferred to an optical duplexer 118 and driven as light signals on the optical fiber 58. Optical signals received by the duplexer 118 from the fiber 58 are transferred to an optical receiver 120, converted to corresponding electrical signals, and then coupled to the gate array chip 100.

The laser driver 116, the optical duplexer 118 and the optical receiver 120 are not part of the invention, and can be implemented with a host of different optical/electrical apparatus. Indeed, instead of using a single optical fiber 58, one fiber can be used for transmission, another fiber for receiving signals, and the duplexer can thus be eliminated by coupling the two optical lines directly to the respective laser driver 116 and optical receiver 120.

Based on the electrical signals input into the gate array chip 100 from the optical receiver 120 on an Rdata line, a voltage controlled crystal oscillator 122 is provided to recover clock pulses from the received NRZ signals. It is noted that while a field programmable gate array 100 is well adapted for the development of prototypes and the like, it is contemplated that a masked semiconductor device is ideally suited in terms of cost and speed considerations. Indeed, those skilled in the art may find that a high speed digital signal processor may function with equal effectiveness, but at a higher cost due to both device cost and software development.

FIG. 7 illustrates in block diagram form the optical interface circuit 94 that is repeated as eight identical circuits in the optical channel shelf 54 of FIG. 5. In the preferred form of the invention, the circuit of FIG. 7 is connected by the optical fiber line 58 to the circuit of FIG. 6. The optical interface unit 94 of FIG. 7 includes an optical duplexer 124 for coupling transmit/receive optical signals to the optical fiber 58. In addition, a laser driver 126 and an optical receiver 128 are coupled to the optical duplexer 124 as well as to a field programmable gate array chip 130. The optical circuits 124, 126 and 128 perform functions substantially identical to those described above in connection with the circuit of FIG. 6. The gate array chip 130 includes memory control circuits for reading and writing a static random access memory 132. Digital data of any type input to the gate array chip 130 is initially stored in the memory 132 and transmitted thereafter, if the bus or line on which the data is to be delivered is not then busy. To that end, the gate array chip 130 is programmed to provide collision detection/avoidance functions. DS1 data communicated between DS1 lines 134 and the gate array chip 130 is processed in a conventional manner by a line interface unit 136. A data packet bus 60 provides a transmit/receive bus with regard to the gate array chip 130. In practice, the data packet bus 60 includes a 4-bit transmit bus and a 4-bit receive bus that are connected to the other seven optical interface units 94 of the optical channel shelf 54. Lastly, an 8-bit PCM bus 76 is connected in common to the other similar buses of the optical channel shelf circuits. The PCM bus 76 carries the PCM voice signals from the various subscribers associated with the optical network units 56, to the digital terminal for further transmission and processing by the central office.

Each gate array chip 130 of the optical channel shelf 54 is provided with clock signals from the common equipment shelf, or other circuits of the digital terminal. The digital terminal includes common digital carrier equipment for transmitting and receiving digitized voice signals according to conventional telecommunications protocols, such as the T1 carrier format. The system clock is input to each gate array chip 130 by way of a phase locked loop circuit 138 that multiplies the clock rate by a factor of eight. The frequency typically input from the phase lock loop 138 to the gate array chip 130 is 12.352 MHz.

In the following detailed description of the optical interface circuits 90 (FIG. 6) and 94 (FIG. 7), it is important to understand the functions provided, rather than the actual hardware or circuitry that provides such functions. As such, those skilled in the art may find that in other situations the functions can be more efficiently carried out or better adapted by using digital processors and/or other software techniques.

Data Packet Transporting Circuits

Figure 8:
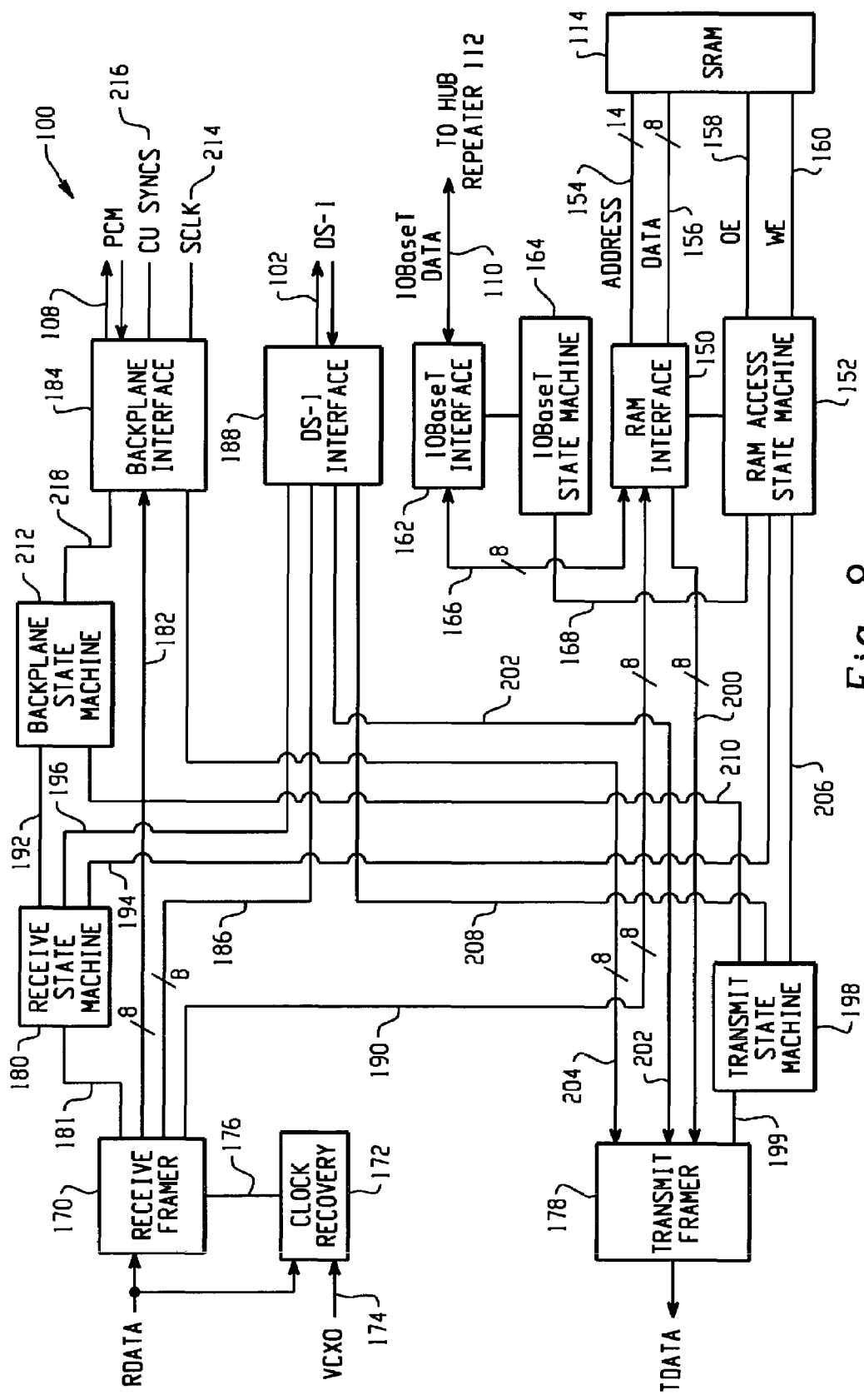
FIG. 8 is a detailed block diagram of a gate array chip of the optical network unit.

With reference now to FIG. 8, there is illustrated in detailed block diagram form the functional circuits of the gate array chip 100 of the optical interface unit 90. In the preferred form of the invention, the gate array chip 100 is fabricated of CMOS circuits in a silicon semiconductor die. This is primarily the case because of the high speed and low cost considerations of such type of circuit construction.

The gate array chip 100 shown in FIG. 8 includes the circuits for carrying out the distributed hub function for the optical interface circuit 90 of the optical network unit 56 shown in FIG. 5. In accordance with an important feature of the gate array chip 100, the data packets input thereto by way of the 10-Base-T PC data bus 110 or the Rdata bus is temporarily stored in the static random access memory 114. Thereafter, when the selected bus on which such data is to be transmitted is found to be idle, the data packet or frame is read from the memory 114 and transmitted accordingly. The memory 114 is sectioned so as to store data packets received from the PC data bus 110 (as received from the subscriber's computers) in one section of the memory 114, and to store frames of Rdata as received from the fiber optic line 58 in another section of the memory 114. The memory 114 is a device that preferably has an access speed of 25 nanoseconds and a total storage capability of 32 K by 8 bits. The address, read and write control of the memory 114 is controlled by a RAM interface circuit 150 and a RAM access state machine 152. The RAM interface 150 includes register circuits for generating addresses as specified by the state machine 152, and includes bidirectional data latches for providing an input and output path of data to the memory 114. The RAM interface is coupled by a 14-bit address line 154 and an 8-bit data line 156 to the memory 114. The RAM interface 150 includes other counters, registers and standard memory control circuits well known to those skilled in the art.

The RAM interface circuit 150 is controlled by the RAM access state machine 152 by a number of control lines extended therebetween. The RAM access state machine 152 includes an output enable line 158 and a write enable line 160 for controlling the reading and writing of the memory 114. As will be described more thoroughly below, the RAM access state machine 152 includes signal and handshake lines extended to other circuits of the gate array chip 100 for coordinating the transmission and receipt of PC data packets and other PCM and DS1 data between the numerous IO ports thereof. In addition, the RAM access state machine 152 includes a receive frame counter and a transmit frame counter for maintaining an account of the respective frames of PC data stored in the memory 114. In other words, when a PC data frame is received from the PC data I/O port 110, such counter is incremented accordingly. On the other hand, when such frame of data is read from the memory and transmitted to the transmit framer circuit, the respective counter is decremented.

On the other hand, when PC packet data is received from the receive framer circuit and stored in the memory, a transmit frame counter is incremented. When such data is read from the memory and transported to the PC data I/O port 110, the transmit frame counter is decremented. It can be seen that the receive frame counter is associated with one section of the memory, and the transmit frame counter is associated with the other section of the memory. In this manner, whenever the counters are greater than unity, received data from one of the input ports has been temporarily stored in the gate array chip 100 and is required to be transmitted as quickly as possible thereafter to the appropriate output port. In order to maximize the throughput efficiency of the chip, the SRAM 114 is a high speed memory that can be written and read at a high speed rate. As will be described below, the RAM access state machine determines whether a frame of PC data is bona fide, and otherwise controls the destination of the PC data packets with respect to the various ports of the gate array chip 100.

A receive framer 170 and a transmit framer 178 are instrumental in coupling receive data and transmit data with respect to the fiber optic line 58. Further, the transmit framer 178 receives 8 bits of parallel data on bus 204 from a backplane interface 184. The data coupled on this bus is PCM voice and other digital data, signals and alarms according to the conventional T1 type of channel equipment. The transmit framer 178 also receives 8-bits of DS1 data on bus 202. A DS1 interface 188 couples 8-bits of DS1 data on bus 202 to the transmit framer 178. Lastly, the transmit framer 178 receives 8-bits of parallel data on bus 200 from the RAM interface 150. The data coupled to the transmit framer 178 on bus 200 is the PC data packets received via the 10-Base-T interface 162 and temporarily stored in the memory 114. In addition, the transmit framer 178 is coupled by a number of control and signal lines 199 to a transmit state machine 198. The transmit framer 178 also includes an alarm input port (not shown) for coupling and multiplexing alarm signals onto the Tdata line. The transmit framer 178 includes a four-port multiplexer for multiplexing the data placed on the buses 200, 202, 204 and the alarm bus (not shown) to a single 8-bit multiplexer output. Then, the eight parallel bits are coupled to a parallel-to-serial converter for converting the eight parallel bits to eight serial bits. Moreover, the transmit framer 178 includes a scrambler circuit for scrambling the bits according to a fifteenth order polynomial algorithm. This is a standard scrambling technique well known by those skilled in the art.

The transmit state machine 198 controls the transmit framer 178 as to which input port to be multiplexed to the output, in accordance with a predefined framing format. To that end, the transmit state machine 198 is designed to multiplex the PCM data from the backplane interface 184, the DS1 data from the DS1 interface 188 and the PC data packets received indirectly from the 10-Base-T interface 162, as well as the alarms, onto a serial Tdata line. The particular multiplexing format employed is not a part of the current invention, as many different data stream formats can be employed. It is noted that a primary function between the transmit framer 178 and the transmit state machine 198 is the signaling to the RAM access state machine 152 the time periods in which data stored in the memory 114 must be read and provided to the transmit framer 178 on bus 200 to fill the predefined time slots.

The receiver framer 170 operates in conjunction with a receive state machine 180 for coordinating the receipt of serial data on the incoming Rdata bus. As noted above, the Rdata bus includes multiplexed PC data packets, PCM data, DS1 and perhaps other signaling and control information data multiplexed thereon. The receive framer 170 includes serial-to-parallel converters, demultiplexers and descramblers for converting the serial data to parallel 8-bit bytes and for distributing such data on the respective 8-bit buses 182, 186 and 190. The receive state machine 180 is coupled to the receive framer 170 by a number of control and signal lines 181 for controlling the demultiplexer and other circuits in the receive framer 170 for distributing data to the various parallel buses 182, 186 and 190. The receive state machine 180 is provided with circuits to recognize the framing intervals of the Rdata frames and to decode the various time slots and the data therein for distribution to the respective parallel buses. As can be appreciated, the same data framing format is employed on the Tdata bus as is employed on the Rdata bus, although this is not a necessary requirement for the operation of the invention.

A clock recovery circuit 172 receives signals from a voltage controlled crystal oscillator 122 on input 174, and receives the serial Rdata on another input thereof. The clock recovery circuit 172 includes conventional clock circuits for recovering the clock from the bit rate of the data bits on the Rdata line. The recovered clock signal is coupled to the receive framer 170 on line 176.

The receive state machine 180 is coupled to the backplane state machine 212 by one or more signal control lines 192. When the receive framer 170 has received PCM data in the appropriate time slots, the receive state machine 180 signals to the backplane state machine 212 on line 192 of such condition, so that the backplane state machine 212 can prepare the backplane interface 184 for receipt of the PCM data byte on bus 182. The receive state machine 180 also communicates with the DS1 interface 188 on control line 196 to provide a similar function, namely, for signaling the DS1 interface 188 that a byte of DS1 data is going to be transferred by the receive framer 170 on bus 186. Lastly, the receive state machine 180 communicates with the RAM access state machine 152 on control lines 194 for signaling the latter that a byte of packet data will be transferred thereto on the 8-bit bus 190. As noted above, the RAM access state machine 152 controls the RAM interface 150 so that when the byte of PC packet data is transferred on bus 190, the data byte is temporarily stored in the interface 150 and associated with a 14-bit address for writing in the memory 114. The receive state machine 180 also includes circuits for detecting a loss of framing on the Rdata line so that the various circuits of the gate array chip 100 can be reset and a new framing interval initiated. Recovery signals can be transmitted between the various circuits of the chip 100 to reset or recover from loss of framing or other failures in the receipt or transmission of data.

The gate array chip 100 is provided with a backplane interface 184 for receiving PCM data from the receive framer 170 on bus 182, and for transferring data to the transmit framer 178 on bus 204. The backplane interface 184 is associated with the backplane state machine 212 and controlled thereby by control signals on lines 218. The backplane interface 184 includes voice and control signal circuitry as well as parallel-serial converters and serial-parallel converters and other circuits for providing synchronization and clock signals, as is standard in the industry. A pair of serial PCM data buses 108 are coupled to respective input ports of the backplane interface 184. One input port includes a serial transmit port and another port is a serial receive port for communicating PCM data. The backplane interface 184 provides channel unit synchronization signals 216 for synchronizing conventional T1 or other type of channels for transmit and receive functions. A clock signal 214 is also provided to the channel units, as is common in the industry.

The DS1 interface 188 includes standard DS1 interface circuitry for converting incoming serial DS1 data to parallel data for output on bus 202. In like manner, parallel data transmitted to the DS1 interface 188 on bus 186 is converted to serial form and output on the serial output line 102. The DS1 transmission protocol framing and synchronization is well known to those skilled in the art. While not shown, the series transmit and receive lines 102 are coupled to a standard DS1 line interface circuit which provides the framing synchronization and formatting operations typical of DS1 transmission protocols.

The 10-Base-T interface 102, as noted above, is coupled to a serial bidirectional line 110 and a parallel 8-bit bidirectional bus 166. Associated with the 10-Base-T interface 162 is a corresponding state machine 164 for controlling the operation of the interface 162, as well as signaling the RAM access state machine 152 on signal and control lines 168. The 10-Base-T interface 162 includes serial-to-parallel converters, and parallel-to-serial converters, bidirectional multiplexers and control signal circuits. While not shown, the 10-Base-T interface 162 includes a number of bidirectional control lines extended to the Ethernet hub chip 112 (FIG. 6). The 10-Base-T state machine 164 includes Ethernet collision/avoidance circuits that operate in conjunction with the Ethernet hub chip to prevent the simultaneous transmission of data on the same bus 110. The 10-Base-T state machine 164 controls the associated interface 162 so as to configure it for the reception of data from either the Ethernet hub chip 112 or from the RAM interface 150. Moreover, the 10-Base-T interface 162 can be controlled to transmit on the serial bus 110, or to transmit PC packet data on the parallel bus 166. In contrast to the transmit framer 178 and the receive framer 170, the 10-Base-T interface 162 can be configured to either be a transmitter or a receiver of PC data packets.

As can be appreciated from the foregoing, the 10-Base-T interface 162, the RAM interface 150, the transmit framer 178 and the receive framer 170 function in a coordinated manner to carry PC data packets in one direction, and in the opposite direction, and at the same time avoid collisions therebetween in an overall manner similar to the Ethernet protocol. To that end, the gate array chip 100 functions to extend and otherwise distribute the Ethernet data packets and thereby function as a distributed Ethernet hub.

The RAM access state machine 152 operates cyclically in four distinct time periods, each of which is about 80 nanoseconds, for a total of 320 nanoseconds. During one period of time, the RAM access state machine is responsive to the receive framer 170 for determining whether a byte of PC data is to be transferred on bus 190 to the RAM interface 150. In the second time period, the RAM access state machine 152 is responsive to the transmit framer 178 so that a byte of PC packet data can be transferred from the memory 114, via the RAM interface 150, to the transmit framer 178 on bus 200. In a third time period, the RAM access state machine 152 is responsive to the transmission of data from the 10-Base-T interface on bus 166 to the RAM interface 150. In the last time period, the RAM access state machine 152 is responsive to the reception of data from the memory 114 via the RAM interface 150 for transport to the 10-Base-T interface 162 via the bus 166. Insofar as the PCM data or the DS1 data is not stored in the memory 114, the RAM access state machine 152 is not involved in the transport of such data.

An example of the distributed hub and data transporting capability of the gate array chip 100, the following is assumed. In transmitting a PC data packet, a frame of data is transported from the computer 10 to the hub repeater chip 112 (FIG. 6). The hub repeater chip 112 conducts its standard collision detection/avoidance routine to determine whether the serial bus 110 is idle for subsequent transmission of the PC data packet thereon. In addition, the data packet transmitted by one PC is echoed by the hub repeater chip 112 to the other three PCs connected to such chip.

The hub repeater chip 112 signals the 10-Base-T interface 162 on lines not shown, that data is available. In like manner, such signals are transferred from the 10-Base-T interface 162 to the 10-Base-T state machine 164 of the presence of a data packet. The 10-Base-T state machine 164 also receives the preamble of the data packet. The preamble of the Ethernet data packet typically includes the destination and source address as well as which bytes of the frame constitute data. On the initial receipt of the Ethernet data packet, the 10-Base-T state machine 164 signals the RAM access state machine 152 on line 168 of the incoming data packet. When converting the serial input data to parallel bytes, the 10-Base-T state machine 162 has sufficient time to signal the RAM access state machine 152. Indeed, when the first byte of actual data has been converted to parallel form by the 10-Base-T interface 162, the state machine 164 signals the RAM access state machine 152 that a byte of data is available. The byte of data is transferred as a eight parallel bits on bus 166 to the RAM interface 150, where it is temporarily stored in a data register. Substantially simultaneously, the RAM access state machine 152 reads an address counter and transfers such address to the RAM interface 150 to be associated with the byte of data. In addition, the RAM access state machine 152 increments the address counter in preparation of storing the next byte of data received from the 10-Base-T interface 162. With the appropriate 14-bit address on the memory address bus 154 and the data byte on the data bus 156, the RAM access state machine 152 controls the write enable line 160 to write the byte of data in the memory 114 at the address presented thereto. Each successive byte of the Ethernet data packet received by the 10-Base-T interface 162 is similarly communicated on bus 166 to the RAM interface 150 and stored at the next address in the memory 114.

The 10-Base-T state machine 164 includes circuits for counting the incoming bytes of data. If an insufficient number of bytes of data are received to constitute a bona fide Ethernet frame, the 10-Base-T state machine 164 will signal the RAM access state machine 152 of the same, whereupon the runt data packet is aborted. In this event, the RAM access state machine 152 will reload the address register with the prior address that was available before the runt data packet was received. With this arrangement, the runt data packet stored in the memory 114 will be overwritten with the subsequently received data packet. The RAM access state machine 152 will also reinitialize the various registers and counters so as to reestablish the states of the circuits as they existed before the runt data packet was received.

The 10-Base-T state machine 164 also includes circuits for counting and detecting data bytes of an Ethernet packet that exceed 1508 bytes. It is noted that the maximum number of Ethernet data bytes may only be 1508 bytes. Hence, in receiving a frame that has more than this number of bytes, it is known that the data packet is invalid. Again, the 10-Base-T state machine 164 will signal the RAM access state machine 152 of the excess number of bytes, whereupon the RAM access state machine 152 will again reset the address counters and other circuits to the states as they existed before the receipt of the invalid data frame.

In monitoring the receipt of the Ethernet data packet, the 10-Base-T state machine 164 will detect an end-of-frame (EOF) field. The EOF field is typically a string of digital ones that does not include an escape flag. In detecting an EOF field, the 10-Base-T state machine 164 signals the RAM access state machine 152 on line 168 that the end of the Ethernet frame has been received. When the last byte of data and the end of frame field have been written by the RAM access state machine 152, via the RAM interface 150 into the memory 114, the RAM access state machine 152 increments a receive frame counter. The receive frame counter signifies the temporary storage of a data packet in the memory 114. As can be appreciated, the RAM access state machine 152 includes a 16 K counter corresponding to the 16 K×8 storage capability of bytes received via the 10-Base-T interface 162. Should a data frame be received whose number of bytes exceeds the last usable memory location, the RAM access state machine 152 detects an overflow condition, and aborts the storage of such frame.

As noted above, the RAM access state machine 152 cyclically determines if there is a request by the transmit state machine 198 to receive a data byte and transmit the same by way of the transmit framer 178. In the example, when the RAM access state machine 152 determines that there is a data request on line 206 from the transmit state machine 198, it is noted that the receive frame counter is greater than zero. In this event, the RAM access state machine 152 to signals to the RAM interface 150 to drive the address bus 154 with the address of the oldest data byte. The output enable line 158 and the write enable line 160 are driven such that the oldest byte stored in the memory 114 is read and presented on the data bus 156. Also, the RAM access state machine 152 signals the transmit state machine 198 of the availability of a data byte, whereupon the RAM interface 150 is controlled to drive the transmit framer data bus 200 with such byte of data. The transmit state machine 198 controls the transmit framer 178 by way of signal and control lines 199 to receive the data byte from bus 200, convert the parallel data to serial data, scramble the data and drive the serial data in the appropriate time slots on the Tdata bus. Periodically, when the PC data time slots are about to exist, the transmit state machine 198 will signal the RAM access state machine 152 of the need for another byte of data for transmission on the Tdata line time slots. The RAM access state machine 152 will continue controlling the RAM interface 150 to read data bytes and provide the same on bus 200 to the transmit framer 178. When the RAM access state machine 152 detects an end of frame flag, constituting a number of binary ones, the receive frame counter will be decremented. In the event that the receive frame counter is at a zero count, and the transmit state machine 198 signals the need for PC data, the RAM access state machine 152 will control the RAM interface 150 to produce a byte of all digital ones, indicating an idle condition or flag. The transmission of the idle state by the transmit framer 178 facilitates the recovery of a clock signal by the optical interface unit 94 in the optical channel shelf 54.

It should be also noted that the transmit state machine 198 controls the input ports of the transmit framer 178 so as to receive bytes of data on the respective buses 200, 202 and 204, to serialize and scramble such data and present the serial data bits in the appropriate time slots on the Tdata bus. In controlling the transmit framer 178, and as noted above, the transmit state machine 198 signals the backplane state machine 212 on line 210, and signals the DS1 interface 188 on line 208 for coupling respective data bytes to the transmit framer 178.

Data transported from the Rdata input at the left side of FIG. 8 to the right side thereof is carried out according to the following. PCM data, DS1 data and PC data packets multiplexed on the fiber optic line 58 are converted to electrical signals and coupled to the Rdata bus. The receive framer 170 and the clock recovery circuit 172 receive the data signals. As noted above, a clock signal is recovered from the data string and provides a time base to the receive framer 170. The receive state machine 180 controls the receive framer 170 by signal and control lines 181 to appropriately descramble the serial data, convert the same to parallel form and multiplex the PCM data to output bus 182, the DS1 data to output bus 186 and the PC data packets to output bus 190. On the receipt of the respective types of data, the receive state machine 180 signals the other state machines of the same so that data can be transported thereto. With regard to the PC data packets, the RAM access state machine 152 is signaled on line 194 by the receive state machine 180, whereupon the preamble of the Ethernet data packet is coupled to the RAM interface 150 on bus 190.

All of the PC data packets received from the receive framer 170 are stored in a different 16 K section of the memory 114, as compared to the data packets received by the 10-Base-T interface 162. As such, the RAM access state machine 152 configures addresses registers in the RAM interface 150 for coordinating the sequential storage of bytes of data received via bus 190 in the second memory section. It should be understood that the RAM access state machine 150 allocates one-fourth of its cycle to the receive framer 170 for receiving PC data packets therefrom. Much like the 10-Base-T state machine 164, the receive state machine 180 also includes circuits for detecting a runt data packet or a data packet that includes too many bytes of data as determined by the Ethernet protocol. When either abnormality occurs, the receive state machine 180 signals the RAM access state machine 152 for the resetting of address registers and other counter circuits. In any event, as the bytes of data of an Ethernet frame are transferred to the RAM interface 150 from the receive framer 170, such bytes are sequentially stored at sequential address locations in the second portion of the memory.

When the RAM access state machine 152 detects an end of frame flag, e.g., an idle flag of all digital ones, a transmit frame counter is incremented. This means that an entire frame of an Ethernet data packet has been stored in the memory 114 and is ready for transfer to the 10-Base-T interface 162. The RAM access state machine signals the 10-Base-T state machine 164 via control line 168 that a frame of data is ready for transmission. When the 10-Base-T state machine 164 signals the RAM access state machine 152 that it is ready to begin receiving the Ethernet data packet, the RAM access state machine 152 causes the first byte of the frame to be read from the memory 114 and transferred to the 10-Base-T interface 162 as parallel bits on bus 166. It should be noted that prior to the signaling by the 10-Base-T state machine 164 that it is ready to receive the Ethernet data packet, it carries out a collision detection/avoidance routine for determining if the serial bus 110 is presently being used by the hub repeater chip 112. This collision detection/avoidance protocol is substantially the same as that used by the Ethernet protocol. Once the 10-Base-T state machine 164 causes the corresponding interface 162 to commence transmission of the Ethernet data packet on the serial line 110, the RAM access state machine 152 continues to read the bytes of the data packet from the memory 114 and pass the same via the RAM interface 150 to the 10-Base-T interface 162. The 10-Base-T interface 162 carries out the reverse operation, in that it converts the parallel bits to serial and transmits the same to the hub repeater chip 112 on the 10-Base-T data line 110. When the RAM access state machine 152 detects the end of the Ethernet data packet, the frame transmit counter will be decremented. Also, the 10-Base-T interface 162 detects the end of the Ethernet data packet and reinitializes the circuits thereof to transport another data packet on bus 166 or on serial bus 110.

From the foregoing, it is noted that the Rdata and Tdata serial buses are clocked at a 12.352 MHz rate, whereas the 10-Base-T serial data bus 110 is clocked at a 10 MHz rate. The clock rate of the receive framer 170 and transmit framer 178 are primarily a function of the optical transmitting apparatus, whereas the data rate on the serial 10-Base-T interface data bus 110 is a function of the Ethernet transmission rate. In order to provide a buffering of the transmit and receive PC data packets by the gate array chip 100, the temporary storage of the same in the memory 114 is important.

With reference again to FIG. 5, different types of data are multiplexed by the optical network unit 56 and carried by the optical line 58 to the optical channel shelf 54. Indeed, each optical interface unit 94 situated at an optical channel shelf 54 receives data packets from plural computers, as well as PCM data from plural telephone sets, and data bytes from a DS1 line. Each of the eight optical interface units 94 of a single optical channel shelf 54 functions to separate the PC data packets from the PCM data and DS1 data. The latter types of data are transferred on bus 76 to a digital terminal, as noted in FIG. 5. In contrast, the communication of all PC data packets, whether being transmitted or received by the optical channel shelf 54, are coupled via the wired-OR data bus 60 which, in practice, includes separate 4-bit buses, one for transmit nibbles and one for receive nibbles. Importantly, the Ethernet hub is extended to the optical channel shelf 54, in that each optical interface unit 94 as well as an optical maintenance unit 62 have circuits for detecting and avoiding collisions based on the attempted simultaneous use of the nibble buses 60. In like manner, the optical maintenance unit 62 and the fast Ethernet switch 66 are programmed with similar collision detection/avoidance algorithms that are common to the Ethernet protocol. Moreover, when one optical interface unit 94 transmits an Ethernet data packet on the wired-OR bus 60, the other seven units 94 receive such data packets and retransmit the same to the respective optical network units 56. Each optical network unit 56 then retransmits the data to each associated computer, thereby providing an extended networking of the data packets between all of the computers. It can be seen that the geographical area in which the data packets are networked is substantially larger than that available using either Ethernet equipment, and without using the expensive Ethernet bridges. The radius of the distributed hub according to the invention is the length of the optical line 58, plus the length of the 10-Base-T lines 17 and 19. As will be described below, the optical line 58 of the preferred embodiment can be replaced with a DS1 or other electrical transmission line. The transporting of data information by the optical interface unit 94 of the optical channel shelf 54 is described below.

Figure 9:
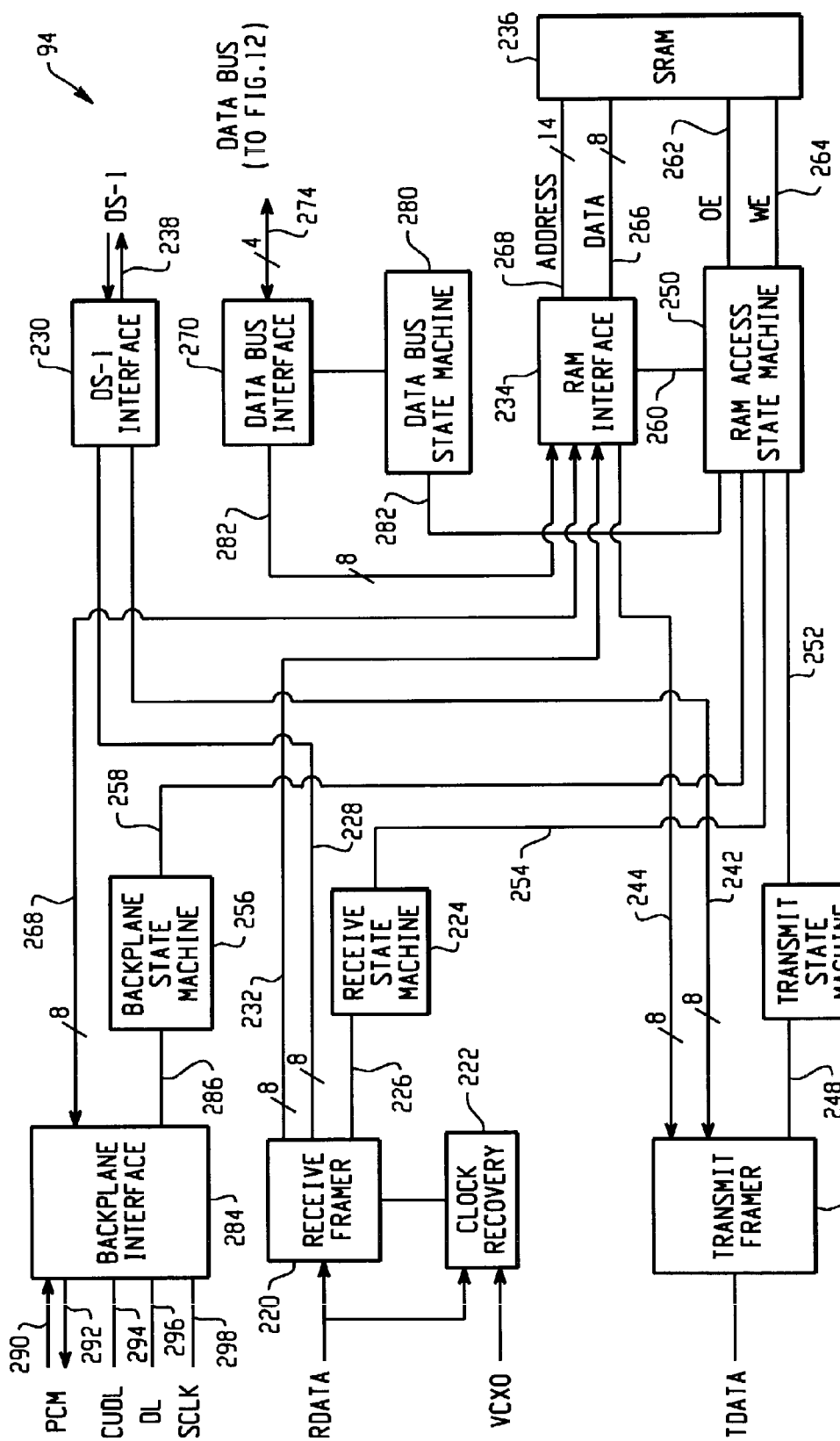
FIG. 9 is a detailed block diagram of a gate array chip of one channel of the optical channel shelf.

In FIG. 9, there is shown a detailed block diagram of an optical interface unit 94 that is situated in each optical channel shelf 54. As described above in connection with FIG. 7, the serial optical data received on the fiber optic line 58 is coupled to the optical receiver 28 and converted to serial, electrical data on the Rdata bus. In like manner, multiplexed serial data is coupled from the gate array chip 130 on the Tdata line, converted to corresponding optical signals by the laser driver 126 and then coupled to the optical duplexer 124 for transmission on the optical fiber line 58. The Rdata and Tdata buses carrying serial, multiplexed data are shown in FIG. 9.

Much like the gate array chip 100 described above in connection with FIG. 8, the gate array chip 94 of FIG. 9 includes a receive framer 220 and a clock recovery circuit 222 that receive the serial data from the Rdata bus. The clock recovery circuit 222 provides clock signals to the receive framer 220 to synchronize the incoming serial Rdata. The receive framer 220 includes serial-to-parallel converters and parallel-to-serial converters as well as a descrambler circuit and bus multiplexers, all controlled by a receive state machine 224 by way of signal and control lines 226. The receive state machine 224 is also coupled to the RAM access state machine 250 by signal and control lines 254. The receive state machine 224 includes circuits responsive to the various time slots of the Rdata bus for demultiplexing the data bytes. The DS1 data is demultiplexed and placed on the 8-bit bus 228 and coupled to a DS1 interface circuit 230. PCM and PC data packets are demultiplexed and placed on the 8-bit bus 232 and coupled to a RAM interface 234. In the gate array chip 94 of the optical channel shelf 54, both PCM and PC data packets are stored in a static random access memory (SRAM) 236. The DS1 interface 230 includes a parallel-to-serial converter and other circuits for directly coupling the DS1 data from the parallel bus 228 to a corresponding serial transmitting bus 238. The serial DS1 data on bus 238 can be further transmitted to the central office 20 by conventional digital carrier lines, or the like, not shown. The converse conversion of serial DS1 data on a receive line 238 to parallel data coupled on bus 242 also takes place.

The gate array chip 94 includes a transmit framer 240 that receives data on a parallel 8-bit bus 242 from the DS1 interface 230. In like manner, the transmit framer 240 receives data on an 8-bit bus 244 from the RAM interface 234. A transmit state machine 246 controls the transmit framer 240 on control and signal lines 248. The transmit framer 240 includes two 8-bit multiplexers and a parallel-serial converter, as well as a data scrambler circuit. The transmit state machine 246 is responsive to the appearance of various time slots of the Tdata bus for placing the DS1 data from bus 244 thereon, or the PCM and PC data packets on bus 244 in the appropriate time slots. The transmit state machine 246 is coupled to a RAM access state machine 250 by signal and control lines 252. In like manner, the RAM access state machine 250 is coupled to a backplane state machine 256 by signal and control lines 258. The RAM access state machine 250 includes a number of signal and control lines 260 for controlling the RAM interface 234.

The buffer memory 236 is a 32 K×8 memory that is sectioned into two 16 K portions. One 16 K×8 portion stores receive PCM data and PC data packet and the other 16 K×8 portion stores transmit PCM and PC packet data. The memory 236 can be a static random access type having an access time of 25 nanoseconds, or faster. The RAM access state machine 250 controls the memory 236 by an output enable line 262 and a write enable line 264. Data is coupled between the memory 236 and the RAM interface 234 by an 8-bit data bus 266. A 14-bit addresses bus 268 provides addresses from the RAM interface 234 to the memory 236. The RAM interface 234 includes circuits that carry out functions substantially identical to the corresponding circuit 150 of the gate array chip 100 of FIG. 8.

Unlike the RAM access state machine 152 of FIG. 8, the RAM access state machine 250 of FIG. 9 provides an arbitration between the multiple accesses to the memory 236 from the various state machines, based on a priority. The RAM access state machine 250 includes circuits for providing the highest priority to the transmit state machine 246 when access is requested of the memory 236. The receive state machine 224 has the next highest priority, and then the backplane state machine 256. The RAM access state machine 250 includes a transmit frame counter and a receive frame counter for maintaining an account of the amount of data temporarily stored in the respective sections of the memory 236 for transmission by the transmit framer 240 or a data bus interface 270.

The data bus interface 270 is coupled by an 8-bit bus 272 to the RAM interface 234. The data bus interface 270 includes a receive circuit coupled to a 4-bit receive bus 274 for sequentially receiving a first data nibble and a second data nibble and for combining the two nibbles into a byte of data. In like manner, the data bus interface 270 includes circuits for converting a byte of data from the bus 272 to two serial data nibbles for sequential transmission on the 4-bit transmit bus 276. The buses 274 and 276 are each wired-OR type of buses, connected in common to the other similar gate array chips 94 of the optical channel shelf 54. The 8-bit data bus interface 270 is controlled by a data bus state machine 280 which, in turn, communicates with the RAM access state machine 250 by way of signal and control lines 282. The data bus state machine 280 includes circuits for preventing collisions on the transmit bus 276 with attempted simultaneous transmissions thereon by the other optical interface units 94 of the optical channel shelf 54. The data bus state machine 280 controls the data bus interface 270 for the transporting of data in accordance with the state diagram of FIG. 10.

The backplane state machine 256 includes circuits for controlling a backplane interface 284 by way of signal and control lines 286. The backplane interface 284 includes a bidirectional 8-bit bus 288 coupled to the RAM interface 234 for transporting PCM data therebetween. The backplane interface 284 includes a receive serial PCM line 290 and a serial PCM transmit line 292, and includes circuits for converting parallel data from the bus 288 to serial data for transmission on the line 292. The interface 284 also includes serial-to-parallel converters for converting the serial data received on bus 290, to corresponding parallel data for transport on bus 288. The backplane interface 284 also includes the standard circuits for detecting framing of the signals. Connected to the backplane interface 284 is also a CUDL bus 294 a data link and alarm bus 296 and a system clock line 298. These buses and lines connected to the backplane interface 284 are coupled to conventional common equipment for transmitting the PCM and other data to the central office 20. In like manner, the DS1 interface 230 is also coupled to the common equipment for transport of the DS1 data to the central office 20.

It should be noted from the foregoing that the gate array chip 94 operates in a synchronous manner, in that the input and output data rates are substantially the same, e.g., operating at 12.353 MHz. To that end, a common clock signal synchronizes all of the state machines for synchronous operation.

Figure 10:
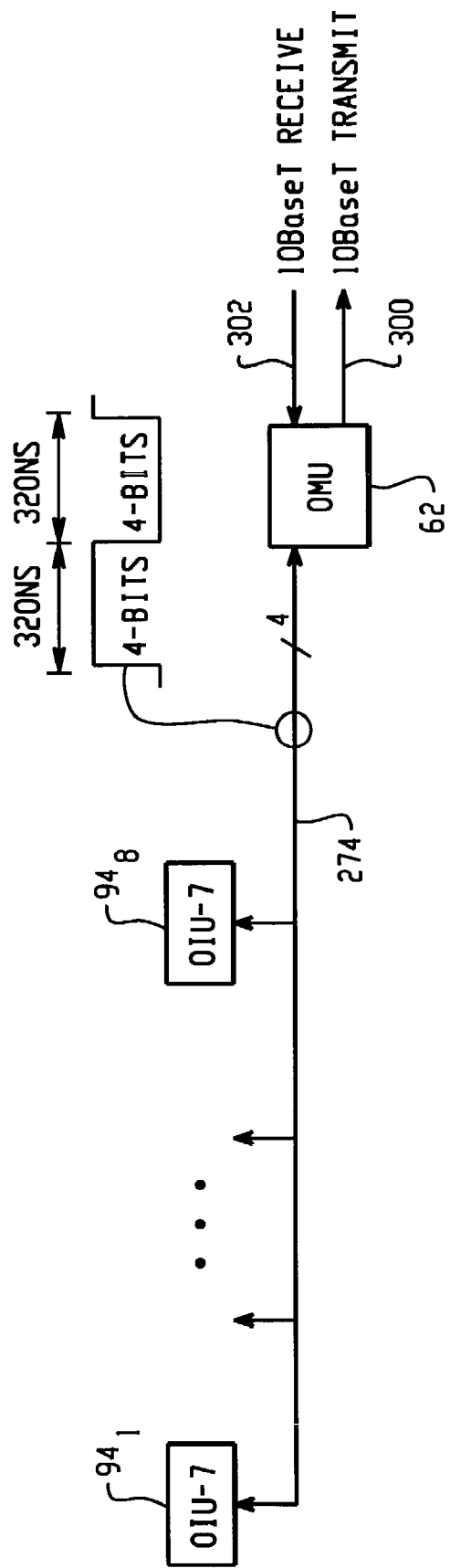
FIG. 10 is a diagram of the wired-OR data bus connecting the optical interface units of the host digital terminal together.

FIG. 10 illustrates the 4-bit bus interconnections between each of the eight optical interface units 94 and the optical maintenance unit 62. With regard to the 4-bit bus 274, eight bits can be transferred from the optical maintenance unit 62 to each optical interface unit 94. Four bits are first transferred in a 320 nanosecond logical high portion of the cycle, and the remaining four bits of a byte are transferred in the 320 nanosecond low going portion of the bus cycle. The most significant bits of the byte are transferred on the logic high portion and the least significant bits are transmitted on the logical low portion of the cycle. Thus, in one bus cycle of 640 nanoseconds in length, a total of eight bits are transferred from the optical maintenance unit 62 to each of the eight optical interface units 94.

The 4-bit bus 274 operates in an identical bus cycle to transmit eight bits to the optical maintenance unit 62, with a most significant nibble transferred during one bus cycle, and the least significant nibble transferred in the remaining half of the bus cycle. While the 4-bit bus configuration is not by way of necessity, those skilled in the art may prefer to transmit eight bits, or one byte on a corresponding 8-bit bus.

Each optical interface unit 94 includes circuits for detecting and avoiding collisions due to the simultaneous attempt to use the 4-bit bus 274. The optical maintenance unit 62 includes the same type of collision avoidance/detection circuits, as it shares the same bus 274. Each data bus interface 270 (FIG. 9) not only includes a 4-bit driver for transmitting a nibble on the transmit bus 274, but also includes in parallel therewith a 4-bit receiver so that it can sense the same bits that it transmits on the bus 274. Moreover, a pair of 4-bit comparators are provided in each optical interface unit 94 to compare the transmitted data on bus 274 with the data received by the same chip on such bus. In this manner, each optical interface unit 94 can ascertain that the bits it transmitted on the bus are maintained at the respective logic high and logic low levels, and are not otherwise corrupted by the attempted use of the bus 274 by another optical interface unit or the optical maintenance unit 62.

In the event that two optical interface units $94_1$ and $94_8$ (FIG. 10) attempt to simultaneously transmit data bits on the bus 274, a collision will eventually occur in which one unit will attempt to drive one bit line of the 4-bit bus 274 low and the other unit will attempt to drive the same bit line of the bus 274 high. Due to the open collector and wired-OR nature of the bus 274, the logic low will dominate and prevail over the logic high signal. The unit attempting to drive the bit line of the bus 274 high will sense that the line was actually driven low, whereupon the comparison between what the unit transmitted on the bus 274 will not match with what such unit sensed on the bus 274. In this event, the unit will register an error. When an optical interface unit 94 registers an error due to a difference between what it transmitted and what it sensed, it will halt transmission for a random period of time before reattempting a subsequent transmission of the nibble.

The optical interface unit 94 that attempted to drive the line of the bus 274 with a logic low signal will not detect an error as it did indeed drive such line low and it sensed the logic low signal on the line of the bus 274. Thus, only one optical unit may eventually prevail, and all other optical interface units 94 in contention for the bus 274 at the same time will detect an error and halt transmission thereof. It can be appreciated that in certain instances the various bits of nibbles transmitted by multiple units may coincide for a while, but eventually the bits will differ. This is because the MAC address of each Ethernet user is different, and the transmitted Ethernet data packet includes the user's MAC address. As noted above, all optical interface units $94_1$ through $94_8$ as well as the optical maintenance unit 62, have such collision detection/avoidance circuits to provide a coordinated use of the bus 274. The operation of the optical maintenance unit 62 in transmitting data on the 10-Base-T transmit line 300 and receiving data on the 10-Base-T receive line 302 will be described in more detail in connection with the function of such unit.

Figure 11:
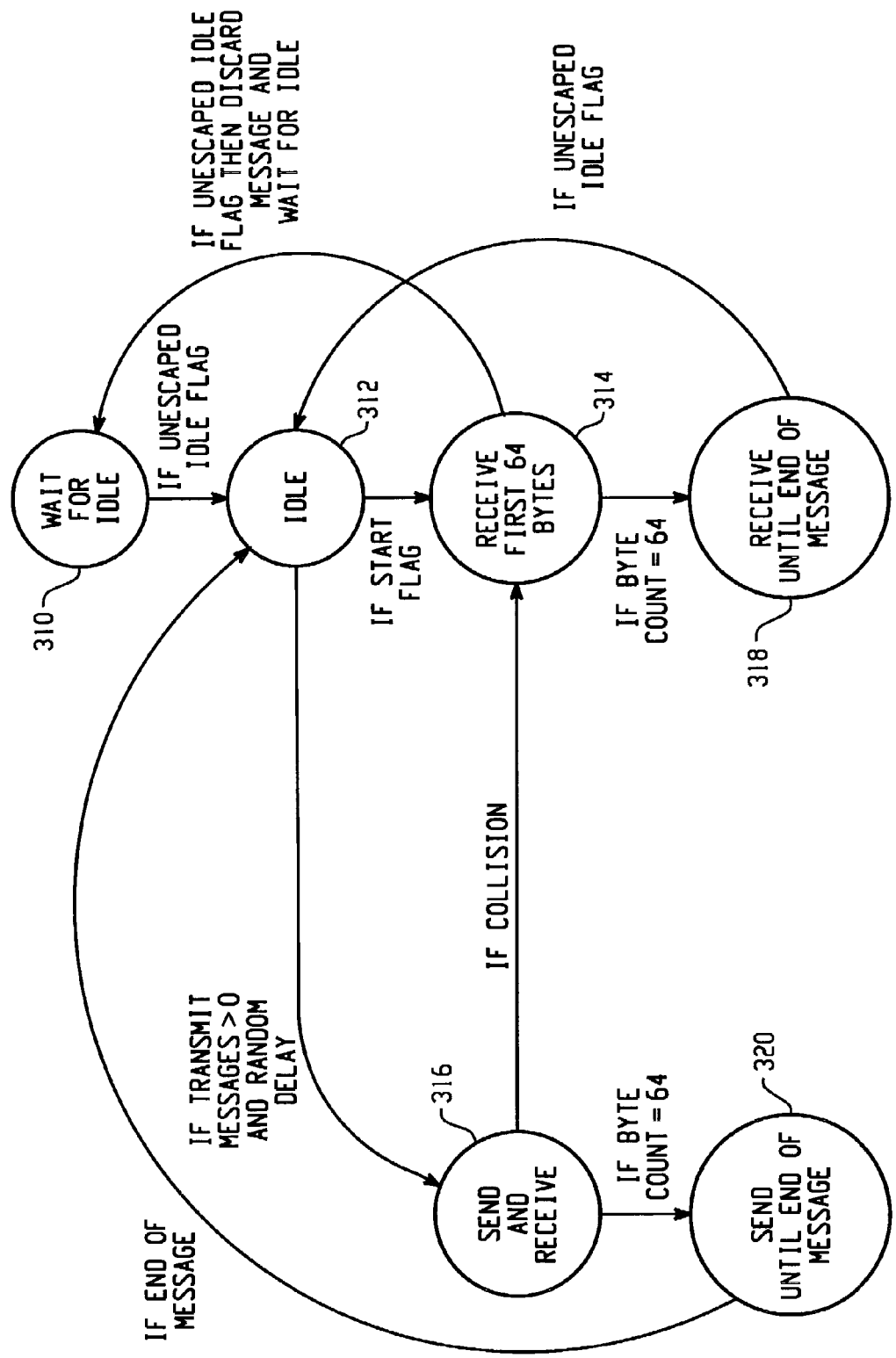
FIG. 11 is a flow chart of the functions of a memory access state machine of a channel circuit in the optical channel shelf.

FIG. 11 is a diagram of the operations of the data bus state machine 280 in communicating data between the bidirectional 8-bit bus 272 and the wired-OR 4-bit bus 274. It should be noted that the data bus interface 270 includes a counter that counts the number of bytes received on the 4-bit data bus 274. Other digital circuits responsive to start, escape and idle flags on the 4-bit bus 274 are also integrated into the data bus interface 270. Moreover the various counters and detectors of the data bus interface 270 signal the data bus state machine 280 of the same. It is noted that an Ethernet start flag comprises a specified number and arrangement of bits according to the Ethernet protocol. An escape flag is also a specified length and arrangement of digital signals. Lastly, an idle flag is a series of all logic ones.

The diagram of FIG. 11 illustrates a number of states in which the data bus state machine 280 undergoes, depending upon the various bus flags detected. In state 310, the data bus state machine 280 sets idle waiting for an idle flag. If an unescaped idle flag is detected on the 4-bit bus 274 by the data bus state machine 280, it proceeds to the idle state 312. From the idle state 312, the data bus state machine 280 can proceed either to state 314 to receive the first 64 bytes of data on bus 274, or to state 316 where, if the transmit frame counter is greater than unity, data is transmitted on bus 274 and such data is received on bus 274. As noted above, because of the wired-OR nature of the 4-bit bus 274, the data bus interface 270 can transmit a nibble on the bus 274 and at the same time sense the data on the bus 274 to determine if the data has been corrupted by the simultaneous use of another circuit sharing the bus 274. With regard to state 314, the data bus state machine 280 has detected a start flag signifying the start of an Ethernet frame of data. The state machine 280 receives the first 64 bytes of data and determines if an unescaped idle flag has been detected therein. If so, the state machine 280 proceeds from state 314 back to the wait state 310. If, on the other hand, no unescaped idle flag has been detected in the first 64 bytes of data, it can be considered that the frame is not a runt frame, whereupon the state machine 280 proceeds to state 318. When it is determined that the Ethernet frame is not a runt frame, a transmit frame counter is incremented to thereby indicate that the memory 236 has stored an Ethernet frame of data as received from the bus 274, and such frame should be transported to the transmit framer 240. In state 318, the data bytes are passed from the data bus interface 270, via the 8-bit bus 272 to the RAM interface 234 for storage in the memory 236. Again, the storage of data bytes is under control of the RAM access state machine 250. As soon as data bytes from a received frame are sequentially stored in the memory 236, the RAM access state machine 250 also begins to read the memory 236 and transfer the bytes in a FIFO manner to the transmit framer 240 on bus 244. As noted above, the RAM access state machine 250 polls the transmit state machine 246 periodically to ascertain whether to transmit data bytes to the transmit framer 240. With this arrangement, the memory 236 does not store an entire frame of Ethernet data before commencement of the transporting thereof to the transmit framer 240. Rather, the memory 236 functions as a first-in, first-out memory so that the transport of data can be commenced before the end of received frame has been detected. The data bus state machine 280 continues to receive data bytes of the Ethernet frame until an unescaped idle flag is detected. When an unescaped idle flag is detected, the data bus state machine 280 returns from state 318 to state 312 to detect a start flag of a subsequent frame.

Returning now to the send and receive state 316, the data bus state machine 280 controls the data bus interface 270 to transmit bytes and receive bytes at the same time. If, during the attempted transmission of a data nibble on bus 274, a collision of data occurs, processing proceeds from state 316 to state 314 where transmission is interrupted and the data bus interface 270 continues to receive nibbles on the bus 274. The collision of simultaneous data transmissions on bus 274 is detected in the manner described above in connection with FIG. 10. To reiterate, if two or more optical interface units 94 attempt to simultaneously transmit on the 4-bit bus 274, each unit will sense and compare what it actually transmitted on the bus versus the logic states that were carried by the bus to determine if a match therebetween exists. In view that a logic low dominates over a logic high on the wired-OR bus 274, only one optical interface unit 94 will eventually prevail, it being the one that drove the bus with a logic low when the contending unit attempted to drive the bus with a logic high. The optical interface unit 94 that dominated the bus 274 continues to transmit thereon, and the other contending units halt transmission for a random period of time before re-attempting to transmit a nibble on the bus 274.

In the event no collision is detected while the data bus state machine 280 is in state 316, and if 64 bytes have been received on the receive nibble bus 274, processing proceeds to state 320 where the data bus state machine 280 continues sending data on nibble bus 274 and continues receiving on nibble bus 274. In state 320, the data bus state machine 280 controls the data bus interface 270 to continue a transmitting nibbles on the bus 274 until an end of frame has been detected. When an end of frame has been detected, the data bus state machine 280 returns to state 312. It is also noted that when the receive framer 220 receives PCM and PC data bytes, the same is transferred and temporarily stored via the RAM interface 234 in the memory 236. However, in order to reduce time delays in the optical interface unit 94, retransmission of the received bytes that are stored in the memory 236 can commence via the data bus interface 270 before the entire frame has been stored in the memory 236.

In the preferred embodiment of the optical interface unit 94, data packets received by the receive framer 220 are temporarily stored and retransmitted on the nibble bus 274 via the data bus interface 270. However, the RAM access state machine 250 could be configured or designed to provide a retransmission of the data packets back over the fiber optical line 58 via the transmit framer 240. With this configuration, the data transmission route undergoes a U-turn, to be redirected toward the origin. The U-turn of data may facilitate testing or other functions. In addition, the RAM access state machine 250 could be configured to retransmit data to both the data bus interface 270 and the transmit framer 240 to provide a parallel branching of the same data.

It can be seen from the foregoing that neither gate array chip 100 or 94 decodes the Ethernet frames to process the various fields thereof or to change the data in the fields, as does an Ethernet bridge. Rather, the Ethernet data frames are merely temporarily stored and transported to a destination. It is also noted that neither gate array chip 94 or 100 requires any minimum round trip timing or maximum bus length, as does the Ethernet equipment. Rather, the collision detection/avoidance technique of the invention merely buffers the data until a retransmission thereof is possible. Also, while two levels of optical interface units 90 and 94 are provided in the preferred embodiment, fewer or more levels can be utilized with the attendant advantages.

Figure 12:
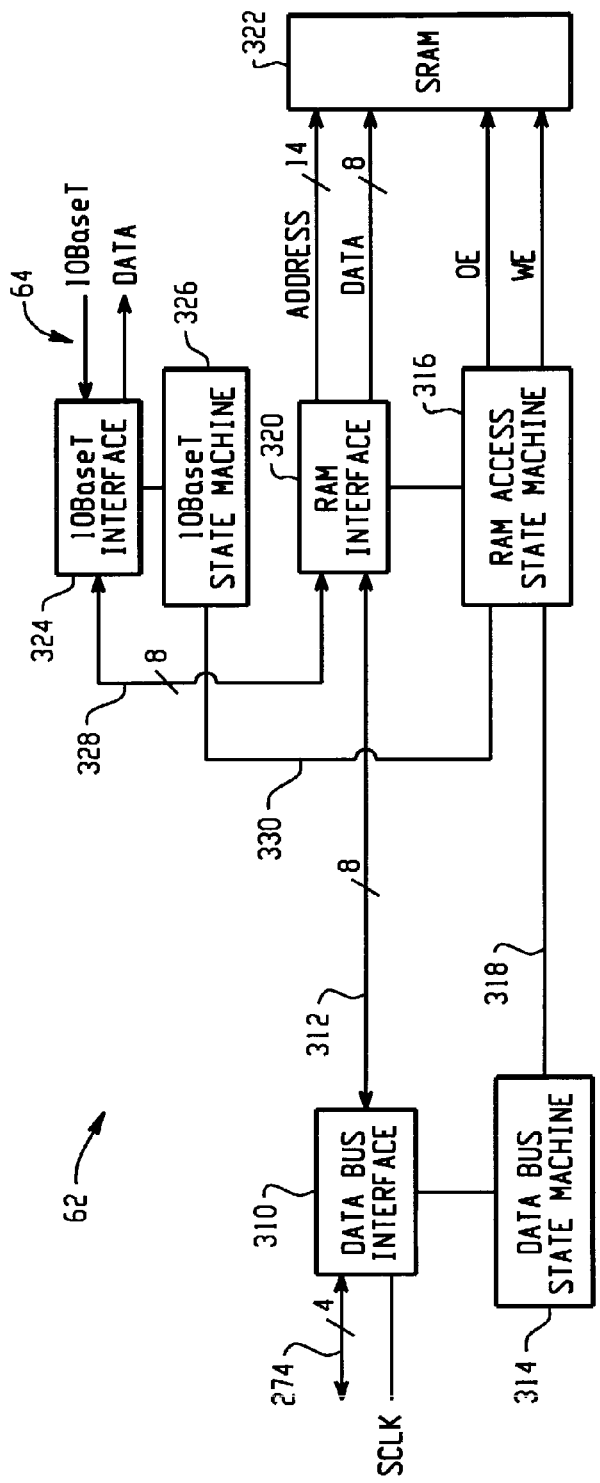
FIG. 12 is a detailed diagram of the major components of a gate array chip of the optical maintenance unit.

FIG. 12 illustrates a detail block diagram of the optical maintenance unit 62. As noted in FIG. 5, the optical maintenance unit 62 is coupled to each of the eight optical interface units 94 by way of the 4-bit bus 274. The function of the optical maintenance unit 62 is to provide a coordinated transfer of PC data packets between each of the eight optical interface units 94 and the fast Ethernet switch 66.

The optical maintenance unit 62 includes a data bus interface 310 for providing an interface to the 4-bit nibble bus 274. To that end, the data bus interface 310 includes circuits very similar to that of the data bus interface 270 shown in FIG. 9. The function of the data bus interface 310 is to provide collision detection/avoidance with regard to the nibble bus 274, and to combine two data nibbles from the nibble bus 274 and provide a full byte of data on the bidirectional data bus 312. Also, the data bus interface 310 includes circuits for converting a byte of data received from the bus 312 to a most significant nibble and a least significant nibble for transport on the nibble bus 274. Like many of the other interfaces in the optical interface unit 94, the data bus interface 310 includes circuits for detecting idle, escape and start flags to signal to a data bus state machine 314 where it is in the processing of a Ethernet data packet. The interface 310 has a counter that counts the number of bytes either transmitted or received to provide detection for runt frames and frames having a number of bytes that exceed the Ethernet protocol. The signaling between the data bus interface 310 and the data bus state machine 314 is carried out on lines connected therebetween. The data bus state machine 314 provides the same type of collision detection/avoidance function on the nibble bus 274, as described above in connection with the optical interface units 94 of FIG. 10. The data bus state machine 314 includes control circuits that are responsive to the start flags, end of frame flags, escape flags and idle flags, and signals the RAM access state machine 316 of the same on signal and control lines 318. The RAM access state machine 316 operates in conjunction with a RAM interface 320 and an SRAM 322 for providing the temporary storage of transmit data in one 32 K×8 memory section and receive data in another 32 K×8 memory section.

A 10-Base-T interface 324 provides an interface to 10-Base-T transmit and receive lines 64. Associated with the 10-Base-T interface 324 is a 10-Base-T state machine 326. The 10-Base-T interface 324 is coupled to the RAM interface 320 by a bidirectional 8-bit bus 328. The 10-Base-T state machine 326 also communicates with the RAM access state machine 316 by signal and control lines 330. It should be noted that the RAM access state machine 316, the RAM interface 320, the memory 322, the 10-Base-T interface 324 and the 10-Base-T state machine 326 operate in a manner identical to the corresponding circuits of the gate array chip 100 shown in FIG. 8. Stated another way, the transfer of data between 10-Base-T transmit and receive lines 102 with respect to the optical network unit receive framer 170 and transmit framer 178 (FIG. 8), is carried out in a manner similar to the operation of the circuit of FIG. 12 which communicates PC packet data between the 10-Base-T lines 64 and the data bus interface 310. Insofar as the circuits for interfacing with the 10-Base-T lines 64 and the storage of data in the memory 322 are similar to those noted above in connection with FIG. 8, the description hereof need not be encumbered with repetitive discussions.

With reference again to FIGS. 5 and 12, it is noted that the optical maintenance unit 62 is coupled by the transmit and receive 10-Base-T lines 64 to the fast Ethernet switch 66. The Ethernet switch 66 is of conventional design and readily available for combining a number of lines 64 together for multiplexing and transmission thereof on a 100-Base-FX high speed line 45. The PC data packets carried back and forth on the high speed line 45 are transported to the internet backbone either directly, or indirectly through a central office. In accordance with an important feature of the invention, the PC data packets are not switched via the central office switching fabric and thus do not compete with subscriber telephone conversations for switching fabric connections.

Figure 13:
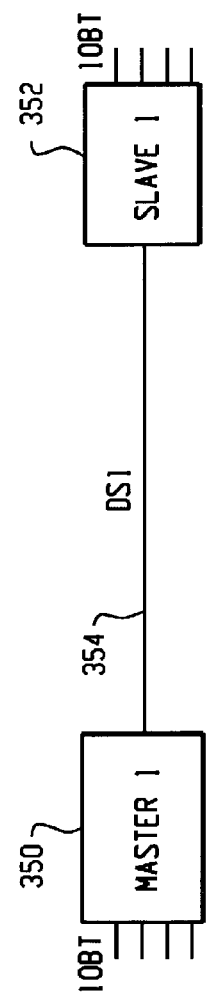
FIG. 13 is a block diagram of another embodiment of a distributed hub that employs a connecting DS1 line.

As noted above, it is not necessary that the distributed hub feature of the invention utilize a fiber optic line 58 to extend the operation of an Ethernet hub. FIG. 13 illustrates the distributed hub feature of the invention employing a master circuit 350 and a slave circuit 352 connected by a DS1 digital carrier line 354. It is significant to note that the DS1 line 354 may extend for hundreds of miles by way of central offices to thereby network data packets between the master circuit 350 and the slave circuit 352. In practice, the DS1 line 354 comprises a transmit DS1 line and a receive DS1 line for providing bidirectional networking of data packets between the master 350 and the slave 352. With this arrangement, the distributed hub function can be utilized to carry Ethernet or other types of data packets over distances well beyond that which can be accommodated by a traditional Ethernet LAN.

When in a transmitting mode, the master 350 or the slave 352 can receive plural 10-Base-T inputs, multiplex the data packets on the DS1 line 354, and transport the same to the destination. At the destination, the data packets are demultiplexed and distributed to the appropriate output. As can be appreciated, the DS1 line 354 would typically pass through one or more central offices or other types of switching systems. The master 350 and the slave 352 would each include programmable logic arrays or gate arrays similar to that described above. In a typical data pack transmission, from the master 350 to the slave 352, the slave 352 receives the data packet as if the data packed were transmitted in the immediate vicinity of the slave computer. In like manner, when the slave 352 transmits a data packet to the master computer 350, the packet is received by the master 350 as if the MAC address of the slave were located in the vicinity of the master 350. The area of coverage is thus significantly extended to many hundreds of miles.

While the present invention has been described above in connection with the various embodiments, it is understood that the present disclosure has been made by way of example, as any changes in detail or structure may be made to the invention without departing from the spirit and scope of the invention as defined by the appended claims.

The invention claim is:

1. A distributed network hub, comprising:
   at least one transmit line;
   first and second transmitters, each coupled to a different end of said transmit line, and each for transmitting data on said transmit line, the first and second transmitters each having a respective separate communication link associated therewith; and
   each transmitter including circuits for avoiding a simultaneous transmission of data on said transmit line, and including a respective buffer memory for temporarily storing received data before transmission thereof on said transmit line, and each transmitter determining an idle status on said transmit line and respective communication link in avoiding a simultaneous transmission of data on said transmit line.

2. The distributed network hub of claim 1, wherein said transmit line comprises a fiber optic line.

3. The distributed network hub of claim 1, further including a plurality of transmit lines coupled in series, with associated transmitters coupled to said transmit lines, at least one said transmit line being greater than about 800 feet in length.

4. The distributed network hub of claim 1, wherein each transmitter is associated with a data receiver for transmitting and receiving data on one said transmit line.

5. The distributed network hub of claim 1, further including in combination a computer equipped with an Ethernet LAN card for transmitting and receiving data and coupled to one end of said transmit line.

6. The distributed network hub of claim 1, further including an optical network unit having circuits for sensing collisions of data, and an optical interface unit having circuits for sensing collisions of data, and a transmission medium for carrying data between the optical network unit and the optical interface unit.

7. The distributed network hub of claim 6, wherein said transmission medium comprises an optical fiber.

8. The distributed network hub of claim 6, wherein said transmission medium comprises a DS1 line.

9. The distributed network hub of claim 1, further comprising:
   an optical fiber coupled to at least one of the transmitters, wherein data transmitted on the optical fiber is passed to the transmit line and data transmitted on the transmit line is passed to the optical fiber.

10. The distributed network hub of claim 1, wherein each transmitter transmits data on the transmit line in response to an idle status indication on both said transmit line and respective communication link.

11. An optical interface unit, comprising:
    an optical duplexer operable to transmit signals to and receive signals from an optical fiber over a communication link;

a gate array unit operable to provide data to and receive data from the optical duplexer, the gate array unit operable to provide data to and receive data from a transmit line, the transmit line being coupled to other gate array units, the gate array unit operable to avoid simultaneous transmission of data with the other gate array units on the transmit line, the gate array unit operable to determine an idle status of both the transmit line and the communication link to avoid simultaneous transmission of data with the other gate array units on the transmit line.

12. An optical interface unit, comprising:

an optical duplexer operable to transmit signals to and receive signals from an optical fiber;

a gate array unit operable to provide data to and receive data from the optical duplexer, the gate array unit operable to provide data to and receive data from a transmit line, the transmit line being coupled to other gate array units, the gate array unit operable to avoid simultaneous transmission of data with the other gate array units on the transmit line;

wherein the gate array unit is operable to separately receive voice signals, digital signals, and data packets, the gate array unit operable to multiplex the voice signals, the digital signals, and the data packets for transport to the optical duplexer, the optical duplexer operable to transmit the multiplexed voice signals, digital signals, and data packets over the optical fiber.

13. An optical interface unit, comprising:

an optical duplexer operable to transmit signals to and receive signals from an optical fiber;

a gate array unit operable to provide data to and receive data from the optical duplexer, the gate array unit operable to provide data to and receive data from a transmit line, the transmit line being coupled to other gate array units, the gate array unit operable to avoid simultaneous transmission of data with the other gate array units on the transmit line;

wherein the gate array unit is operable to receive electrical signals from the optical duplexer corresponding to optical signals received from the optical fiber, the electrical signals including voice signals, digital signals, and data packets, the gate array unit operable to extract the voice signals, digital signals, and data packets from the electrical signal.

14. The optical interface unit of claim 13, wherein the gate array unit is operable to provide the voice signals onto a voice bus, the digital signals onto a digital bus, and the data packets onto a data bus.

15. The optical interface unit of claim 14, wherein the gate array unit is operable to check an idle status on each of the voice bus, the digital bus, and the data bus in order to avoid simultaneous transmissions thereon.

16. A method for data transmission, comprising:

determining an idle status of an input/output line associated with a device and at least one other separate input line associated with the device;

transmitting data on the input/output line in response to the input/output line and the at least one other separate input line being idle in order to avoid simultaneous transmissions thereon.

17. The method of claim 16, further comprising:

demultiplexing voice signals, digital signals, and data packets from the data;

transmitting the data packets on the input/output line.

18. The method of claim 17, further comprising:

separately receiving voice signals, digital signals, and data packets;

multiplexing the voice signals, digital signals, and data packets;

transmitting the multiplexed voice signals, digital signals, and data packets.

19. A method for data transmission, comprising:

receiving data for transmission;

determining an idle status of a transmit line, the transmit line being shared by other transmit units;

transmitting the data on the transmit line in response to the transmit line being idle in order to avoid simultaneous transmissions thereon;

demultiplexing voice signals, digital signals, and data packets from the received data;

transmitting the data packets on the transmit line;

determining an idle status of a voice bus and a digital bus, the voice bus and the digital bus being separate from the transmit line and shared by other transmit units;

transmitting the voice signals on the voice bus in response to the voice bus being idle in order to avoid simultaneous transmissions thereon by multiple transmit units;

transmitting the digital signals on the digital bus in response to the digital bus being idle in order to avoid simultaneous transmissions thereon by multiple transmit units.

* * * * *

UNITED STATES PATENT AND TRADEMARK OFFICE
CERTIFICATE OF CORRECTION

PATENT NO. : 7,356,042 B2  Page 1 of 1
APPLICATION NO. : 10/176542
DATED : April 8, 2008
INVENTOR(S) : Barry J. Ethridge et al.

It is certified that error appears in the above-identified patent and that said Letters Patent is hereby corrected as shown below:

Title page, item [73] under Assignee: change Tellabs Beford, Inc. to "Tellabs Bedford, Inc."

Title page, item [60] add Related U.S. Application Data:
"This application is a continuation of U.S. Application No. 09/325,619, filed on June 3, 1999."

Signed and Sealed this

Sixteenth Day of March, 2010

David J. Kappos
*Director of the United States Patent and Trademark Office*